(12) United States Patent
Gunjima et al.

(10) Patent No.: US 7,175,509 B2
(45) Date of Patent: Feb. 13, 2007

(54) GRINDER AND METHOD OF AND APPARATUS FOR NON-CONTACT CONDITIONING OF TOOL

(75) Inventors: Munehisa Gunjima, Tokyo (JP); Tomoaki Nakasuji, Tokyo (JP); Kouji Yokota, Tokyo (JP)

(73) Assignee: Itsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/755,343

(22) Filed: Jan. 13, 2004

(65) Prior Publication Data

US 2004/0142644 A1    Jul. 22, 2004

Related U.S. Application Data

(62) Division of application No. 10/127,610, filed on Apr. 23, 2002, now Pat. No. 6,793,562.

(30) Foreign Application Priority Data

Apr. 23, 2001  (JP) .............................. 2001-124615
Apr. 15, 2002  (JP) .............................. 2002-111549

(51) Int. Cl.
  *B24B 1/00*   (2006.01)
  *B24B 21/18*  (2006.01)
(52) U.S. Cl. ................. 451/56; 451/177; 451/178; 451/289; 451/443; 451/444; 451/540; 451/541; 451/547; 451/548

(58) Field of Classification Search ................ 451/177, 451/178, 289, 443, 444, 540, 541, 547, 548
See application file for complete search history.

(56) References Cited

U.S. PATENT DOCUMENTS

| 4,533,812 A | * | 8/1985 | Lorenz ................... 219/121.68 |
| 5,906,246 A | * | 5/1999 | Mensa-Wilmot et al. ... 175/432 |
| 6,595,844 B1 | * | 7/2003 | Mizuno et al. ............. 451/540 |

FOREIGN PATENT DOCUMENTS

| JP | 61-103776 A | 5/1986 |
| JP | HEI9-193023 | 7/1997 |
| JP | HEI9-285962 | 11/1997 |
| JP | HEI10-09270 | 4/1998 |
| JP | 10-113878 A | 5/1998 |
| JP | HEI10-02529 | 8/1998 |
| JP | HEI11-99474 | 4/1999 |
| JP | HEI11-56714 | 6/1999 |
| JP | HEI11-85971 | 10/1999 |
| JP | 2001-088032 A | 4/2001 |

\* cited by examiner

*Primary Examiner*—Joseph J. Hail, III
*Assistant Examiner*—Shantese McDonald
(74) *Attorney, Agent, or Firm*—Sughrue Mion, PLLC

(57) ABSTRACT

Truing of a grinder is performed by irradiating a laser beam onto abrasive grains on the outermost periphery of the grinder from the tangential direction of the grinder. Truing of the grinder for adjusting the number of working abrasive grains and the shape of the abrasive grains involved in the actual machining is performed under a non-contact condition and at highly accurately, thereby enabling highly accurate and highly efficient machining.

8 Claims, 21 Drawing Sheets

FIG.3
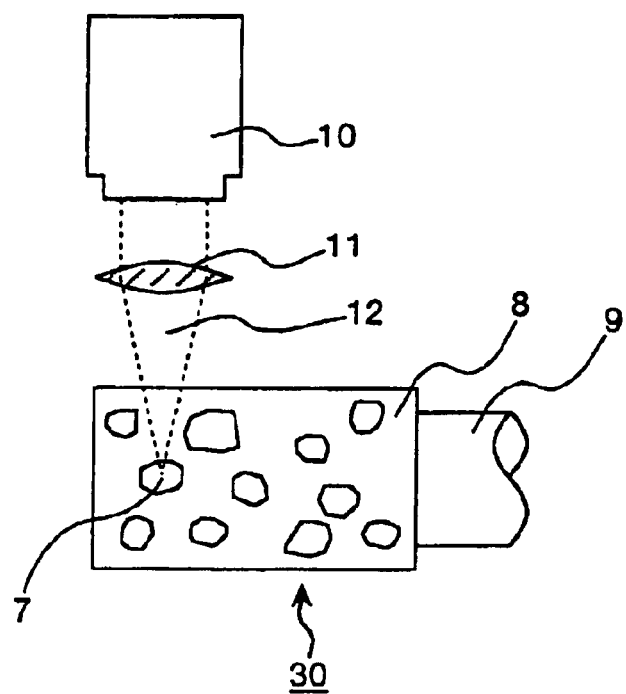
FIG.4
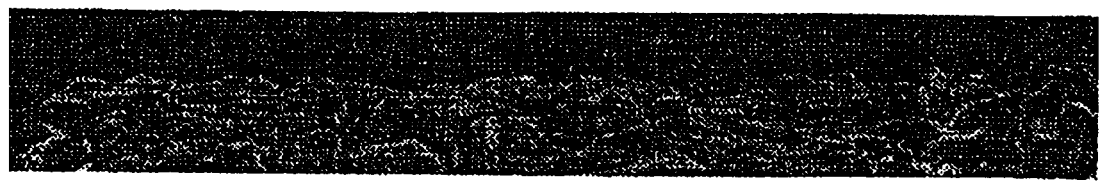
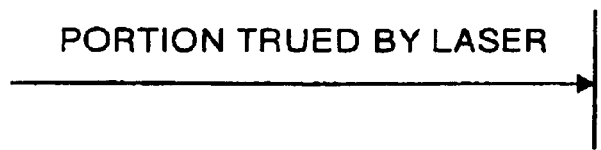

| USED GRINDER | SURFACE ROUGHNESS | CUTTING RESISTANCE | |
|---|---|---|---|
| | | FEED FORCE | THRUST FORCE |
| GRINDER TRUED BY LASER | 68 μm Ry | 5N | 100N |
| GRINDER WITHOUT TRUING | 99 μm Ry | 15N | 100N |

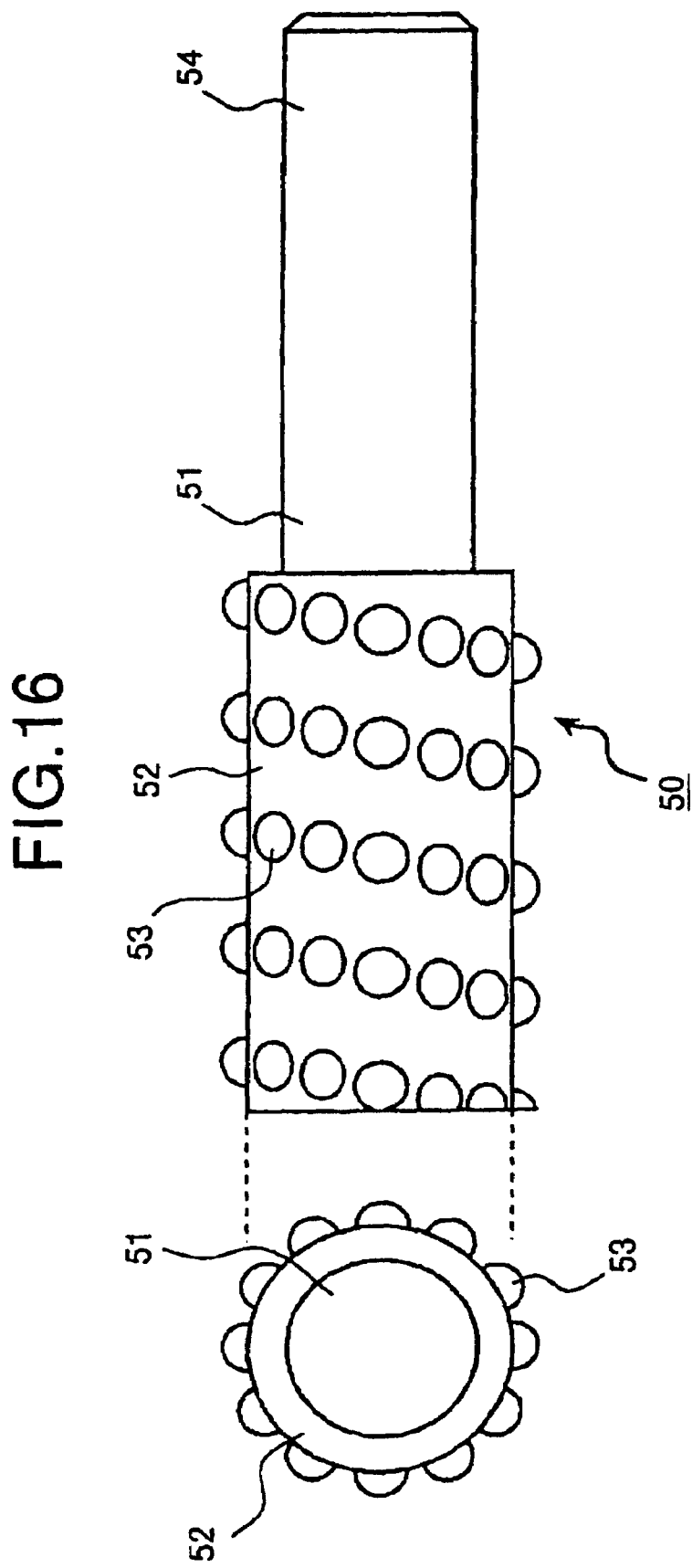

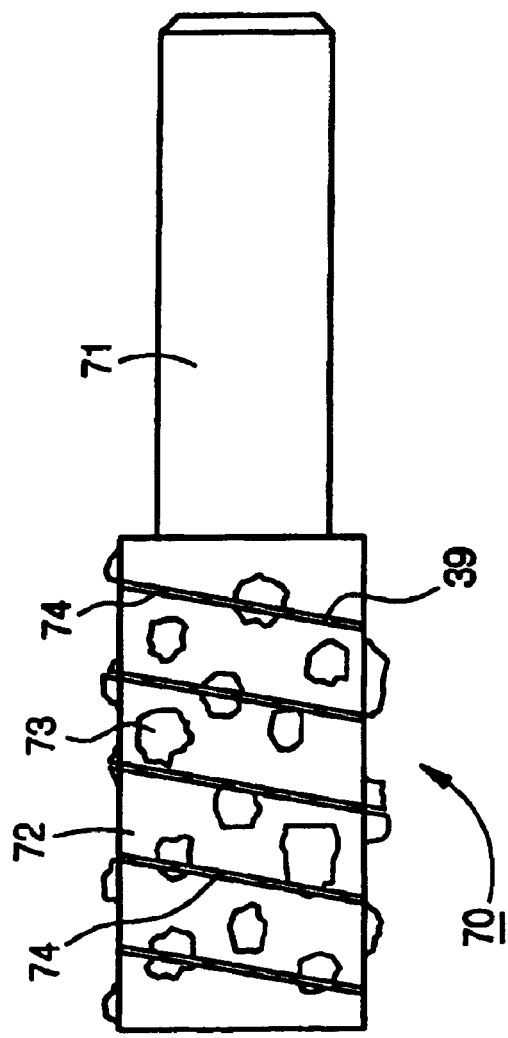
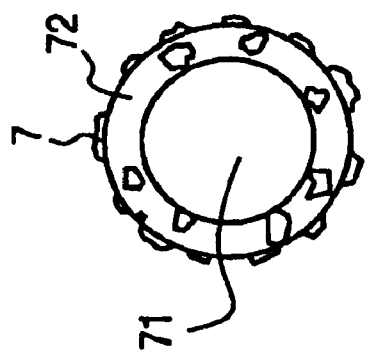
FIG.19B
FIG.19A

GRINDER AND METHOD OF AND APPARATUS FOR NON-CONTACT CONDITIONING OF TOOL

This is a divisional of application Ser. No. 10/127,610 filed Apr. 23, 2002 now U.S. Pat. No. 6,793,562; the disclosure of which is incorporated herein by reference.

FIELD OF THE INVENTION

The present invention relates to a method of and apparatus for non-contact conditioning of tools, for truing, dressing or cleaning tools such as a grinder or a cutting tool, by using a laser. More particularly, this invention relates to a grinder used for side machining of a scroll (spiral vane) built in an air-conditioning scroll compressor, or for finish machining of a mold.

BACKGROUND OF THE INVENTION

One of the tools used for side machining of a scroll built in a scroll compressor is an end mill. FIG. 25 shows an end mill 100 used for side machining of the scroll (spiral vane). In FIG. 25, 102 denotes a cutting edge, 103 denotes a groove between the cutting edges 102, 104 denotes a core diameter, 105 denotes a shank serving as a portion which holds the end mill 100 with a jig or the like, and 106 denotes an angle of torsion of the cutting edge. FIG. 26 shows a scroll 107, being a workpiece to be machined, and the scroll 107 has a scroll tooth 108.

When side machining of the scroll tooth 108 of the scroll 107 is to be carried out by the end mill 100, the shank 105 of the end mill 100 is fitted to a rotation unit such as a motor, to rotate the end mill 100 by the rotation unit. At this time, the scroll 107 or the end mill 100 is shifted so as to follow the scroll shape, while the cutting edge 102 of the end mill 100 is brought into contact with the side face of the scroll tooth 108, thereby side machining of the scroll tooth 108 is carried out.

In the side machining by the end mill 100, however, the position where the cutting edge 102 contacts with the machined surface of the scroll tooth 108 changes due to the torsion of the cutting edge 102. Particularly, as the angle of torsion 106 decreases, the change of the contact position of the cutting edge 102 increases. As described above, in the side machining by the end mill 100, since the distance between the position where the shank 105 is fitted and the position where the cutting edge is brought into contact with the scroll tooth changes largely, the machining load varies largely, causing a problem in that high machining accuracy cannot be ensured. With a small-diameter end mill 100 having a large groove 103 and a small core diameter 104, the rigidity becomes low, and the end mill 100 bends, causing a problem in that the machining accuracy decreases.

Therefore, for this kind of machining, a grinder is often used. An ordinary grinder in which a binder is formed of vitrified or resin, is formed by mixing and stirring abrasive grains and the binder powder, followed by molding into a desired shape, and sintering the molded article. Therefore, minute holes exist therein, and hence the chips discharging property is not so bad. On the other hand, an electrodeposited grinder is produced by holding the abrasive grains by plating, and hence minute holes existing in the ordinary grinder do not exist, thereby deteriorating the chips discharging property.

FIG. 27 shows a columnar electrodeposited grinder 109 used for side machining of the scroll. In FIG. 27, 110 denotes a columnar base metal, 111 denotes a plating layer formed of nickel or chromium on the side face of the base metal 110, and 112 denotes abrasive grains of CBN or diamond arranged in one layer on the surface of the plating layer 111, and the abrasive grains 112 are put together at random and fixed on the plating layer 111.

When side machining of the scroll tooth 108 of the scroll 107 is to be carried out, using such an electrodeposited grinder 109, a portion of the grinder base metal 110 of the electrodeposited grinder 109 where the abrasive grains 112 are not electrodeposited is fitted to a rotation unit such as a motor, and the electrodeposited grinder 109 is rotated by the rotation unit. At this time, the electrodeposited grinder 109 or the scroll 107 is shifted so as to follow the scroll shape, while the abrasive grains 112, being the cutting edge, are brought into contact with the side face of the scroll tooth 108, thereby side machining of the scroll tooth 108 is carried out.

In the above electrodeposited grinder 109 in the conventional art, since the abrasive grains 112 are put together at random and fixed on the whole surface of the grinder, lots of abrasive grains as the cutting edge work on the machined surface, regardless of the existence of truing, thereby causing a problem in that the machining load is large. Particularly, since a small-diameter grinder has small shaft rigidity, it easily deforms, and has a problem in that the grinder bends to decrease the machining accuracy, or the grinder life is shortened, due to an increase of the machining load.

As described above, in the conventional electrodeposited grinder, since the abrasive grains are put together at random on the whole surface of the grinder, lots of abrasive grains as the cutting edge work on the machined surface, to increase the machining load, thereby it is difficult to obtain high machining accuracy. The conventional electrodeposited grinder has also poor chips discharging property.

In JISB4130 and JISB4131 in the JIS Standard, there is an indication relating to the grain size of abrasive grains of the CBN or diamond electrodeposited grinder, and the shape of the grinder. This indication, however, relates to the grain size of the abrasive grains 112 and the shape of the grinder base metal 110, and does not indicate the arrangement of the abrasive grains 112 on the surface of the grinder base metal 110.

Techniques relating to the truing method and the dressing method of the grinder are shown in JISB4134, JISB4135, JISB4136 or JISB4137 in the JIS Standard. These are for installing tools for truing or dressing so as to come in contact with the grinder to carry out truing and dressing.

These conventional art shown in the JIS Standard is a method for bringing the tool into contact with the grinder, and hence machining resistance is produced at the time of truing or dressing, causing unintended exhaustion of the cutting edge, dropout of abrasive grains or exhaustion of the binder, and further there is a problem of short life span of the tool. Further, there is a disadvantage in that deformation or cracking may occur with respect to a grinder with a small-diameter shaft having low rigidity, a grinder with a thin blade, or a small-diameter end mill.

Therefore, there has been proposed a technique for performing non-contact truing or dressing, using a laser beam. The technique relating to the non-contact truing or dressing is disclosed in, for example, Japanese Patent Application Laid-Open No. 11-285971 shown in FIG. 28.

In this conventional art, at either a time of stopping or rotating a grinder 113, a laser beam is irradiated from a laser oscillator 115 to a grinder use plane 114a or a grinder auxiliary use plane 114b through a lens 116, to dissolve and evaporate a binder, to thereby adjust the amount of abrasive grains to be protruded and the outline of the abrasive grains. The grinder use plane 114a or the grinder auxiliary use plane 114b is observed by a portable confocal laser microscope 117. A feedback mechanism 118 determines the optimum conditions of the maximum laser output and pulse width to obtain a desired amount to be protruded and the optimum conditions of the laser irradiation position to obtain a desired grinder outline, and feeds back the determined optimum conditions to the laser oscillator 115.

In the conventional non-contact dressing and truing methods, it is disclosed that only the binder on the use plane of the grinder or on the auxiliary use plane of the grinder is dissolved and evaporated without damaging the abrasive grains, by using a laser beam having a wavelength other than the wavelength at which absorption of infrared rays and ultraviolet rays and selective absorption of impurities take place, to thereby control the amount of abrasive grains to be protruded and the grinder outline. However, control of a difference ingrain size of the abrasive grains and a difference in height of working abrasive grains of the grinder is not disclosed therein.

SUMMARY OF THE INVENTION

It is an object of the present invention to obtain a method of and apparatus for non-contact conditioning of tools, to make highly accurate and highly efficient machining possible, by making it possible to carry out truing of a grinder which adjusts the number of working abrasive grains actually involved in machining and the shape of the abrasive grains, truing of a cutting edge of a cutting tool, dressing for adjusting the amount of abrasive grains to be protruded, or cleaning for removing attachments adhered on the grinder in a non-contact manner.

It is another object of the present invention to obtain a grinder in which the machining load is decreased to make highly accurate machining possible and the chips discharging property is improved.

The non-contact conditioning method according to this invention is a non-contact conditioning method of tools for carrying out truing of a grinder by irradiating a laser beam onto the grinder as a tool, wherein truing of the grinder is carried out by irradiating the laser beam onto the abrasive grains on the outermost periphery of the grinder from the tangential direction of the grinder.

According to this invention, since truing of a grinder is carried out by irradiating the laser beam onto the abrasive grains on the outermost periphery of the grinder from the tangential direction of the grinder, it becomes possible to adjust the number of working abrasive grains and the shape of the abrasive grains highly accurately, without damaging the binder, thereby enabling highly accurate and highly efficient machining. Also, since it is possible to increase the number of working abrasive grains, the sharpness of the grinder is stabilized, thereby contributing in extending the life span of the grinder. It is also possible to control the grinder in an optional shape.

The non-contact conditioning method of tools according to the next invention is a non-contact conditioning method of tools for carrying out truing of a cutting tool by irradiating a laser beam onto the cutting tool. The truing of the cutting tool is performed by irradiating the laser beam onto the cutting edge on the outermost periphery of the cutting tool from the tangential direction thereof.

According to this invention, since truing for conditioning the shape of an edge of the cutting tool is carried out by irradiating the laser beam onto the cutting edge on the outermost periphery of the cutting tool from the tangential direction thereof, it is possible to adjust the shape of the edge or the height of the edge of the cutting tool highly accurately, thereby enabling highly accurate and highly efficient machining.

The non-contact conditioning method of tools according to the next invention is a non-contact conditioning method of tools for carrying out dressing of a grinder by irradiating a laser beam onto the grinder as a tool. Dressing of the grinder is carried out by selectively irradiating the laser beam so that the laser beam is irradiated only to the binder portion of the grinder.

According to this invention, the laser beam is selectively irradiated so that the laser beam is not irradiated onto the abrasive grains of the grinder, but irradiated only to the binder portion, thereby dressing for adjusting the amount of the abrasive grains to be protruded is carried out. As a result, the amount of the abrasive grains to be protruded can be adjusted highly accurately, thereby enabling highly accurate and highly efficient machining.

The non-contact conditioning method of tools according to the next invention is a non-contact conditioning method of tools for carrying out cleaning of a grinder by irradiating a laser beam onto the grinder as a tool. Cleaning of the grinder is carried out by selectively irradiating the laser beam so that the laser beam is irradiated only to the attachments adhered on the grinder.

According to this invention, the laser beam is selectively irradiated so that the laser beam is irradiated only to the attachments such as chips adhered on the grinder to remove the attachments, thereby cleaning of the grinder is carried out. As a result, the attachments such as chips adhered on the grinder can be reliably removed, without damaging the abrasive grains and the binder, thereby enabling highly accurate and highly efficient machining.

The apparatus for non-contact conditioning of tools according to the next invention is an apparatus for non-contact conditioning of tools which carries out truing of a grinder by irradiating a laser beam onto the grinder as a tool. The apparatus comprises a laser beam irradiation unit which irradiates the laser beam onto abrasive grains on the outermost periphery of the grinder from the tangential direction of the grinder, an observation unit which observes the laser-beam-irradiated portion of the grinder, and a control unit which controls the laser beam irradiation unit so as to obtain a predetermined number of working abrasive grains or a predetermined shape of the abrasive grains, based on observed output of the observation unit.

According to this invention, truing is carried out so as to irradiate the laser beam onto the abrasive grains on the outermost periphery of the grinder from the tangential direction of the grinder, so that a predetermined number of working abrasive grains or a predetermined shape of the abrasive grains is obtained, based on the observed output of the observation unit. Therefore, the number of working abrasive grains and the shape of the abrasive grains can be adjusted highly accurately without damaging the binder, thereby enabling highly accurate and highly efficient machining. Also, since it is possible to increase the number of working abrasive grains, the sharpness of the grinder is stabilized, thereby contributing in extending the life span of the grinder. It is also possible to control the grinder in an optional shape.

The apparatus for non-contact conditioning of tools according to the next invention is an apparatus for non-contact conditioning of tools which carries out truing of a cutting tool by irradiating a laser beam onto the cutting tool. The apparatus comprises a laser beam irradiation unit which irradiates the laser beam onto a cutting edge on the outermost periphery of the cutting tool from the tangential direction of the cutting tool, an observation unit which observes the portion of the cutting tool irradiated by the laser beam, and a control unit which controls the laser beam irradiation unit so as to obtain a predetermined shape of the edge, based on observed output of the observation unit.

According to this invention, truing is carried out so as to irradiate the laser beam onto the cutting edge on the outermost periphery of the cutting tool from the tangential direction of the cutting tool, so that a predetermined shape of the edge is obtained, based on the observed output of the observation unit. Therefore, the shape of the edge of the cutting tool or the height of the edge can be adjusted highly accurately, thereby enabling highly accurate and highly efficient machining.

The apparatus for non-contact conditioning of tools according to the next invention is an apparatus for non-contact conditioning of tools which carries out dressing of a grinder by irradiating a laser beam onto the grinder as a tool. The apparatus comprises a laser beam irradiation unit which irradiates a laser beam onto the grinder, an observation unit which observes the laser-beam-irradiated portion of the grinder, and a control unit which controls the laser beam irradiation unit to selectively irradiate the laser beam so that the laser beam is irradiated only to a binder portion of the grinder, and controls the laser beam irradiation unit so as to obtain a predetermined amount of the grinder to be protruded, based on observed output of the observation unit.

According to this invention, since dressing for selectively irradiating the laser beam is executed so that the laser beam is irradiated only to the binder portion of the grinder and a predetermined amount of the grinder to be protruded is obtained, based on the observed output of the observation unit, the amount of the grinder to be protruded can be adjusted highly accurately, thereby enabling highly accurate and highly efficient machining.

The apparatus for non-contact conditioning of tools according to the next invention is an apparatus for non-contact conditioning of tools which carries out cleaning of a grinder by irradiating a laser beam onto the grinder as a tool. The apparatus comprises a laser beam irradiation unit which irradiates a laser beam onto the grinder, an observation unit which observes the laser-beam-irradiated portion of the grinder, and a control unit which controls the laser beam irradiation unit to selectively irradiate the laser beam so that the laser beam is irradiated only to attachments adhered on the grinder, based on observed output of the observation unit.

According to this invention, since cleaning for selectively irradiating the laser beam is executed so that the laser beam is irradiated only to the attachments such as chips adhered on the grinder, based on the observed output of the observation unit, the attachments adhered on the grinder can be reliably removed without damaging the abrasive grains and the binder, thereby enabling highly accurate and highly efficient machining.

The grinder according to the next invention is a grinder in which abrasive grains are fixed on the plane of a disc-shaped base metal or on the circumference of a columnar base metal, in which the abrasive grains are arranged helically on the plane of the base metal on which the abrasive grains are fixed.

According to this invention, since the abrasive grains are arranged helically, the abrasive grains are arranged so as to continuously machine a surface of a workpiece to be machined, thereby improving the accuracy of the machined surface. Also, the interval from when one abrasive grain has come in contact with the workpiece until the next abrasive grain comes in contact with the workpiece becomes short, and the fluctuation in the machining load decreases, thereby enabling highly accurate machining. Further, the chips discharging property is improved due to a decrease in the number of the abrasive grains, and the machining load also decreases.

The grinder according to the next invention is a grinder in which abrasive grains are fixed at random on the plane of a disc-shaped base metal or on the circumference of a columnar base metal. The grinder is subjected to truing by the irradiation of a laser beam and includes a plane which fixes abrasive grains, on which a groove is formed by the irradiation of the laser beam.

According to this invention, truing is carried out by the irradiation of the laser beam to equalize the height of the abrasive grains, and a groove is formed on the plane which fixes the abrasive grains by the laser irradiation. Therefore, accuracy of the machined surface and the chips discharging property are improved, and the machining load decreases.

Other objects and features of this invention will become understood from the following description with reference to the accompanying drawings.

BRIEF DESCRIPTION OF THE DRAWINGS

FIG. 3 is a side view which shows a conceptual configuration for explaining the truing method of a grinder according to the first embodiment of this invention, FIG. 4 is a diagram which shows a halftone image displayed on a display, which shows the surface of an electrodeposited grinder after the truing processing, with regard to the experimental result by the first embodiment of this invention, FIG. 16 is a front elevational and a cross sectional view which show an electrodeposited grinder according to a ninth embodiment of this invention, FIG. 19 is a front elevational and a cross sectional view which show an electrodeposited grinder according to an eleventh embodiment of this invention.

DETAILED DESCRIPTION

Preferred embodiments of the method and apparatus for non-contact conditioning of tools according to this invention will now be explained in detail, with reference to the accompanying drawings.

First Embodiment

Figure 1:
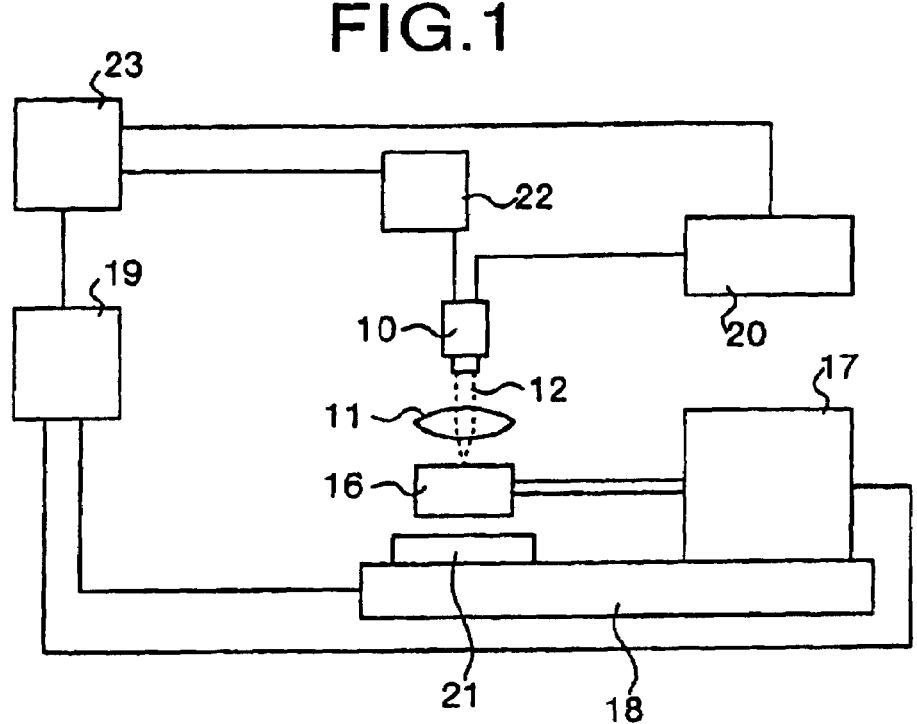
FIG. 1 is a block diagram which shows a configuration example of a non-contact tool conditioning system to which this invention is applied.

A first embodiment of this invention will be explained. FIG. 1 shows the non-contact tool conditioning system for performing non-contact conditioning of tools, described later. Tools mentioned in this specification refer to grinders such as an electrodeposited grinder, a metal grinder and a resin grinder, and cutting tools such as an end mill, by a general term. The system shown in FIG. 1 can perform truing, dressing and cleaning with respect to the electrodeposited grinder, metal grinder or resin grinder, and perform truing with respect to the end mill and remove a built-up edge.

In FIG. 1, a tool 16 is fitted to a spindle (axis of rotation) of a motor 17. The motor 17 is mounted on a table 18 movable in the X-Y direction. On the table 18, there is arranged a protective plate 21 at a position corresponding to the place irradiated by a laser. The shift of the table 18 and the rotation of the motor 17 are controlled by a non-contact control unit 19.

A laser oscillator 10 is controlled by a laser control unit 20. The laser beam 12 irradiated from the laser oscillator 10 such as a YAG laser is irradiated onto the tool 16 via an optical system 11 including a condenser lens. The irradiated state of the laser beam 12 and the state of the tool 16 are observed by an observation unit 22 such as a camera. The observation result of this observation unit 22 is input to an integrated control unit 23, as well as being output to a monitor (not shown) and the like so that the operator can confirm the result. The observation unit 22, the laser control unit 20 and the non-contact control unit 19 are comprehensively controlled by the integrated control unit 23.

In the configuration shown in FIG. 1, the position of the tool 16 rotated by the motor 17 is optionally controlled by controlling the movement of the table 18 by the non-contact control unit 19. The laser beam 12 irradiated from the laser oscillator 10 passes through the optical system 11 including the condenser lens, so that the beam diameter thereof is stopped down. The laser beam whose beam diameter has been stopped down is irradiated onto the tool 16, to thereby carry out truing, dressing or cleaning of the tool 16. While the surface of the tool is being confirmed by the observation unit 22, the laser irradiation position is adjusted, so that the laser beam 12 is irradiated aiming at a desired target position. That is, the integrated control unit 23 controls the non-contact control unit 19 of tools and the laser control unit 20, based on the observation result of the observation unit 22, to thereby carry out truing, dressing or cleaning of the tool 16 to obtain a desired tool 16. The present invention is not limited to carrying out laser irradiation while observing the tool, and similar effect can be obtained by observing the tool after the laser irradiation.

Figure 2:
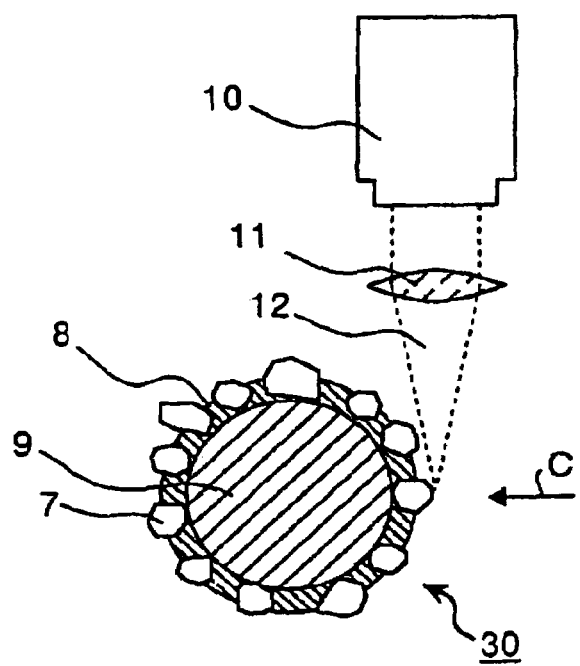
FIG. 2 is a cross sectional view which shows a conceptual configuration for explaining a truing method of a grinder according to a first embodiment of this invention.

In the first embodiment, an electrodeposited grinder is subjected to the truing processing by using the non-contact tool conditioning system. FIG. 2 and FIG. 3 are cross sectional and front elevational views, which show the truing processing by the first embodiment.

In FIG. 2 and FIG. 3, the electrodeposited grinder 30 has a grinder base metal 9 fitted to the spindle of the motor 17, a plating layer 8 and abrasive grains 7 formed by electrodeposition on the periphery of the grinder base metal 9. This electrodeposited grinder 30 has a columnar shape, and the plating layer 8 and the abrasive grains 7 are formed on the outer periphery thereof. For example, CBN abrasive grains are used for the abrasive grains 7, a nickel plating is used for the plating layer 8, and a YAG LASER in which the beam diameter is stopped down up to about 10 μm by the lens system 11 including the condenser lens is used for the laser beam 12.

At the time of truing the electrodeposited grinder 30, the motor 17 is rotated to rotate the electrodeposited grinder 30. In this state, the irradiation position and the irradiation direction of the laser are controlled so that the laser beam 12 is irradiated onto the abrasive grains 7 on the outermost periphery of the grinder 30 from the tangential direction thereof. Thereby, the outermost portions of the abrasive grains 7 where the laser beam has been irradiated are dissolved, evaporated and removed. Then, by moving the table 18 or moving the optical system 11 axially with respect to the grinder 30, to thereby move the laser beam 12 axially with respect to the grinder 30, the laser irradiation position is shifted axially with respect to the grinder 30. As a result, the truing locus of the laser beam becomes helical.

When the laser irradiation position is moved to the end of the grinder 30, deflection control is performed by which the laser irradiation position is slightly shifted in the radial direction towards the center of rotation (shown by an arrow C) of the grinder, and then the laser irradiation position is shifted axially in the opposite direction of the grinder 30, to carry out the similar truing. These truing is repeated based on the observation result of the observation unit 22, until a necessary number of working abrasive grains is obtained, or until a necessary shape of abrasive grains is obtained, or until necessary deflection accuracy is obtained. Since truing exceeding the diameter of the abrasive grain or the thickness of the grinder layer is not allowed to be carried out, it is necessary to adjust the deflection amount to be not larger than the diameter of the abrasive grain or the thickness of the grinder before the truing.

According to this first embodiment, since truing is carried out in which the laser beam 12 is irradiated onto the abrasive grains 7 on the outermost periphery of the grinder 30 from the tangential direction of the grinder 30, only the abrasive grains 7 can be trued, without damaging the plating layer 8. As a result, the number of working abrasive grains or the shape of the abrasive grains can be controlled highly accurately (variations in the tip positions of the abrasive grains are reduced). Therefore, highly accurate machining and highly efficient machining by the electrodeposited grinder 30 become possible. Further, a distortion of the grinder due to the machining resistance and a positional difference of the abrasive grains on the grinder, which cause a problem in the contact type truing, can be prevented. Since this invention is the non-contact truing system, it is also adaptable to any grinders having low rigidity such as a shaft grinder of a small diameter.

In this instance, since the laser beam is continuously irradiated, the truing locus becomes helical. However, any optional truing locus can be obtained by changing over irradiation or non-irradiation of the laser beam and by appropriately changing the moving locus of the irradiation position.

The truing may be carried out by a special purpose machine for truing of grinders, or by a cutting plate. When the truing is carried out by the cutting plate, more accurate rotation control and tool fitting are possible. Hence, a difference in fitting the grinder to the spindle and the influence of the rotation deflection of the spindle can be reduced.

Figures 5, 6:
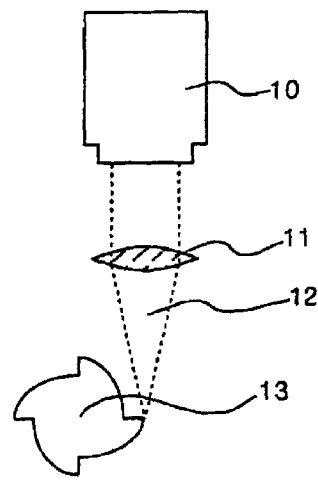
FIG. 5 is a diagram which shows the result of a machining test carried out by using a grinder subjected to truing and a grinder not subjected to truing.
FIG. 6 is a cross sectional view which shows a conceptual configuration for explaining a truing method of a cutting tool according to a second embodiment of this invention.

FIG. 4 and FIG. 5 show experiment results of truing which has been carried out with respect to the electrodeposited grinder 30, using the YAG laser beam and according to the method of the first embodiment. FIG. 4 shows a halftone image displayed on a display, which shows the surface of an electrodeposited grinder after the truing processing. FIG. 5 shows the result of a machining test carried out by using a grinder having been subjected to the truing processing.

In this experiment, an electrodeposited grinder 30 with a shaft having a diameter of 8 mm is used. In this electrodeposited grinder 30, the CBN abrasive grains of #30 (the grain size of from 570 μm to 740 μm) as abrasive grains 7 are held by an Ni plating as a binder 14. The left part in FIG. 4 shows the portion which has been subjected to truing.

For the YAG laser, one having an oscillation wavelength of 355 nm, an average output of 3 W, a pulse energy of 0.6 mJ, a pulse width of 200 ns, a number of cycles of 5 kHz, a beam diameter of 10 μm, and an average power density of $5.5 \times 10^6$ W/cm$^2$ was used.

As seen from FIG. 4, in the portion which has been subjected to truing, the tip portion of the abrasive grains 7 is equalized, but the portion which has not been subjected to truing has irregularities in a range of about 20 μm.

A machining test was carried out to compare the performance of the grinder having been subjected to truing as described above and that of the grinder which has not been subjected to truing. For the machining test, a machining center was used. As a workpiece, an SKD 11 material of HRC60 was used. The machining condition was such that a notch was 0.5 mm, the diameter of the grinder: 8 mm, the number of revolutions of the grinder: 18000 rpm, the feed rate: 100 mm/min., and the thickness of the workpiece was 5 mm. As the amount removed, the amount corresponding to 0.5 mm, the depth of the cut, was evaluated from the size of the workpiece before and after the machining.

As shown in FIG. 5, the feed force of the cutting resistance in the grinder having been subjected to the truing is 5 N, which is about one third of that of the grinder which has not been subjected to truing. This is because the load of each abrasive grain is made uniform due to the equalization of the tips of the abrasive grains, indicating that highly efficient machining is possible. Further, the surface roughness of the workpiece machined by the grinder having been subjected to the truing is about two thirds of that of the workpiece machined by the grinder which has not been subjected to truing, indicating that highly accurate machining is possible.

Second Embodiment

Figure 7:
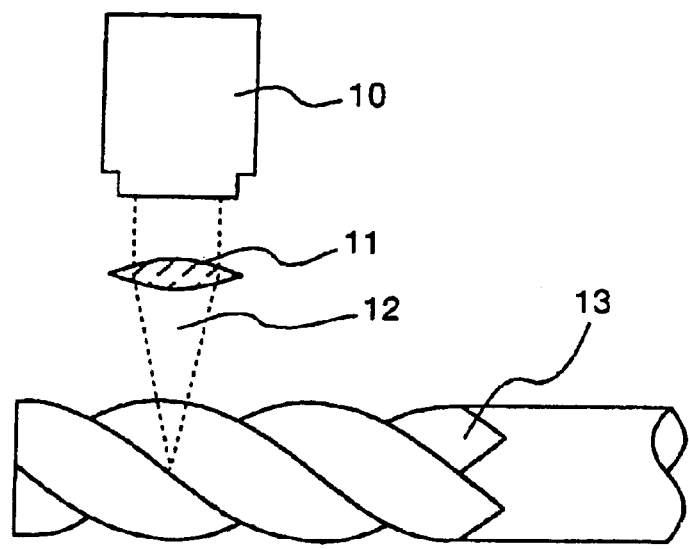
FIG. 7 is a side view which shows a conceptual configuration for explaining the truing method of the cutting tool according to the second embodiment of this invention.

A second embodiment of this invention will be explained using FIG. 6 and FIG. 7. In the second embodiment, an end mill as a cutting tool is subjected to truing by using the non-contact tool conditioning system shown in FIG. 1. FIG. 6 and FIG. 7 are respectively cross sectional and front elevational views which explain the truing according to the second embodiment.

Figure 13:
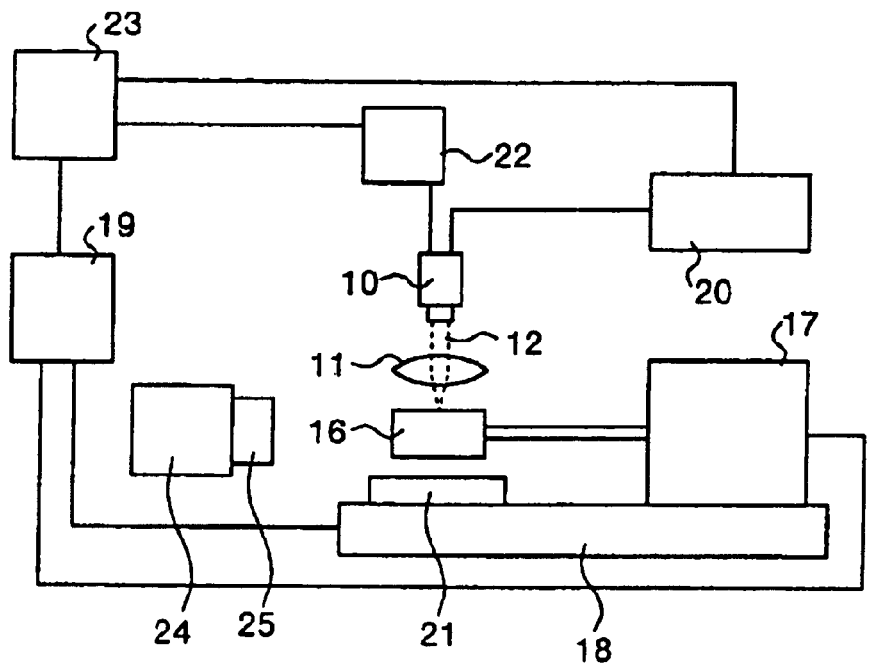
FIG. 13 is a block diagram which shows a configuration example of a non-contact tool conditioning system according to a sixth embodiment of this invention.

In FIG. 6 and FIG. 7, 13 denotes an end mill, 10 denotes the laser oscillator, 11 denotes the optical system including the condenser lens, and 12 denotes the laser beam irradiated from the laser oscillator 10 and condensed by the optical system 11. For example, a CBN end mill having four blades is used for the end mill 13, and a YAG laser in which the beam diameter is stopped down to 10 μm is used for the laser beam 12.

When the end mill 13 is subjected to truing, the motor 17 is rotated to rotate the end mill 13. In this state, the irradiation position and the irradiation direction of the laser are controlled so that the laser beam 12 is irradiated onto the cutting edge (edge) on the outermost periphery of the end mill 13 from the tangential direction thereof. Thereby, the outermost portions of the end mill 13 where the laser beam has been irradiated are dissolved, evaporated and removed. Then, by moving the optical system 11 axially with respect to the end mill 13, to thereby move the laser beam 12 axially with respect to the end mill 13, the laser irradiation position is shifted axially with respect to the end mill 13.

When the laser irradiation position is shifted to the end of the end mill 13, the similar deflection control is performed by which the laser irradiation position is slightly shifted in the radial direction of the end mill 13, and then the laser irradiation position is shifted axially in the opposite direction of the end mill 13, to carry out the similar truing. These truings are performed based on the observation result of the observation unit 22 within the range in which a flank width is available, until a necessary deflection width or a necessary edge shape or edge height is obtained. By such truing, the edge position can be controlled, and variations in the edge positions can be reduced. Therefore, by using this end mill, highly accurate machining and highly efficient machining become possible. Further, it is possible to prevent a distortion of the end mill due to the machining resistance and variations in the edge positions of the end mill, which cause a problem in the contact type truing. The present invention can also correspond to an end mill having a complicated shape.

In addition, in this instance, an optional truing locus can be obtained by changing over the existence or nonexistence of the laser beam irradiation and by appropriately changing the moving locus of the irradiation position. An optional taper angle may be also added.

The truing of the cutting tool may be carried out by a special purpose machine for truing of cutting tools, or by a machining center. When the truing is carried out by the machining center, more accurate rotation control and tool fitting are possible. Hence, a difference in fitting the end mill to the spindle and the influence of the rotation deflection of the spindle can be reduced.

Third Embodiment

Figure 8:
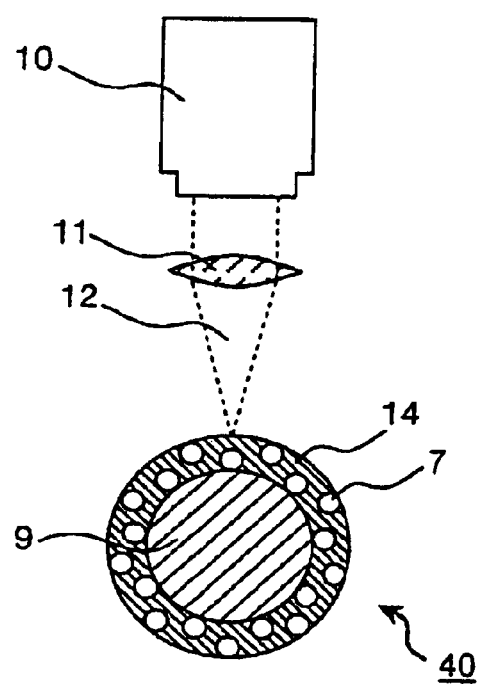
FIG. 8 is a cross sectional view which shows a conceptual configuration for explaining a dressing method of a grinder according to a third embodiment of this invention.
Figure 9:
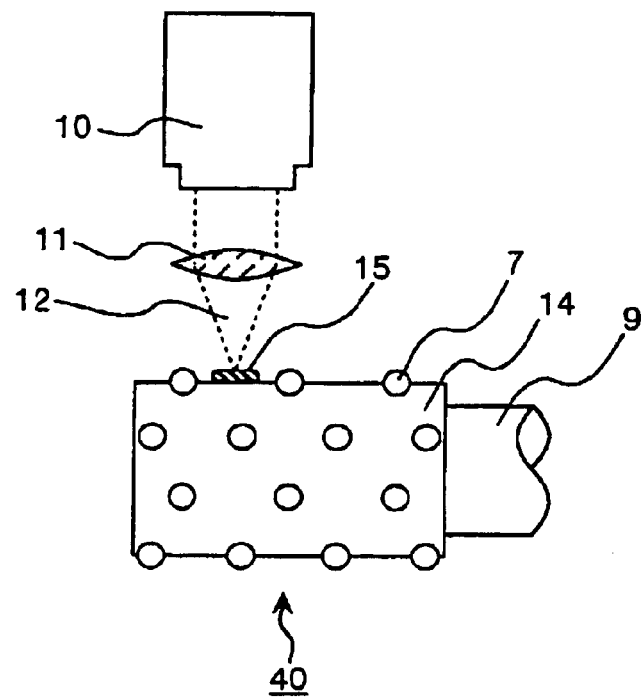
FIG. 9 is a side view which shows a conceptual configuration for explaining the dressing method of the grinder according to the third embodiment of this invention.

A third embodiment of this invention will be explained by using FIG. 8 and FIG. 9. In the third embodiment, a binder portion of a grinder 40 such as a metal grinder or a resin grinder is subjected to dressing, using the non-contact tool conditioning system shown in FIG. 1. FIG. 8 and FIG. 9 are respectively cross sectional and front elevational views which explain the dressing according to the third embodiment.

In FIG. 8 and FIG. 9, 40 denotes a grinder, 7 denotes abrasive grains, 14 denotes the binder, 9 denotes the grinder base metal, 10 denotes the laser oscillator, 11 denotes the optical system including the condenser lens, and 12 denotes the laser beam irradiated from the laser oscillator and condensed by the optical system 11. For example, CBN abrasive grains are used for the abrasive grains 7, metal such as iron is used for the binder 14 and a YAG laser in which the beam diameter is stopped down to 10 μm is used for the laser beam 12.

When the grinder 40 is subjected to dressing, the motor 17 is rotated to rotate the grinder 40. The irradiation position and irradiation direction of the laser are also controlled, so that the laser beam 12 is irradiated towards the axial center of the grinder 40, in other words, from the direction of a normal of the grinder 40. In this state, laser on/off control or switching control of the laser beam blocking member (shutter) is performed by the laser oscillator 10 based on the observation result of the observation unit 22 so that the laser beam 12 is not irradiated onto a portion of the abrasive grains 7 but irradiated only to the binder 14, and thereby the laser beam 12 is selectively irradiated towards the grinder 40. Accordingly, only the binder 14 is dissolved, evaporated and removed. Then, by moving the optical system 11 axially with respect to the grinder 40, to thereby move the laser beam 12 axially with respect to the grinder 40, the laser irradiation position is shifted axially with respect to the grinder 40.

When the laser irradiation position is shifted to the end of the grinder 40, the similar deflection control is performed by which the laser irradiation position is slightly shifted towards the center of the grinder 40, and then the laser irradiation position is shifted axially in the opposite direction of the grinder 40, to carry out the similar dressing. These dressings are repeated based on the observation result of the observation unit 22, until a necessary amount of the grinder to be protruded is obtained.

In the third embodiment, as described above, the laser beam is selectively irradiated by using the laser beam whose beam diameter is stopped down to 10 μm so that the laser beam 12 is not irradiated onto the portions of abrasive grains 7 but irradiated only to the binder 14. Therefore, the amount of abrasive grains to be protruded can be controlled highly accurately, without damaging the abrasive grains. Thereby, highly accurate machining and highly efficient machining become possible, using the grinder 40.

The non-contact dressing may be performed by a special purpose machine for dressing of the grinder, or by a cutting plate. When the dressing is carried out on the cutting plate, more accurate rotation control and tool fitting are possible. Hence, a difference in fitting the grinder to spindle and the rotation deflection of the spindle can be reduced.

Fourth Embodiment

Figure 10:
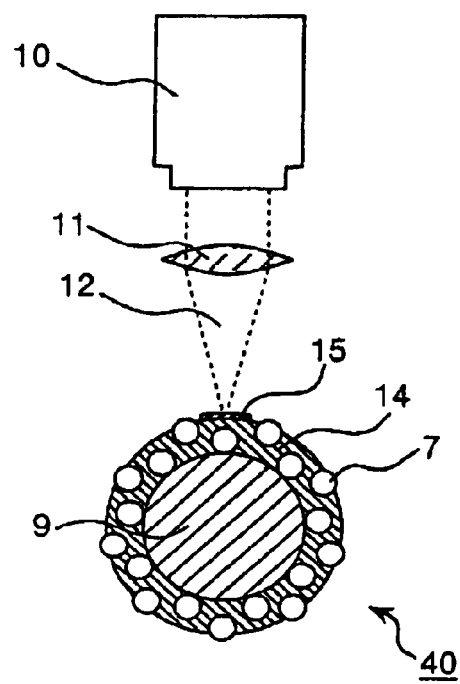
FIG. 10 is a cross sectional view which shows a conceptual configuration for explaining a cleaning method of a grinder according to a fourth embodiment of this invention.
Figure 11:
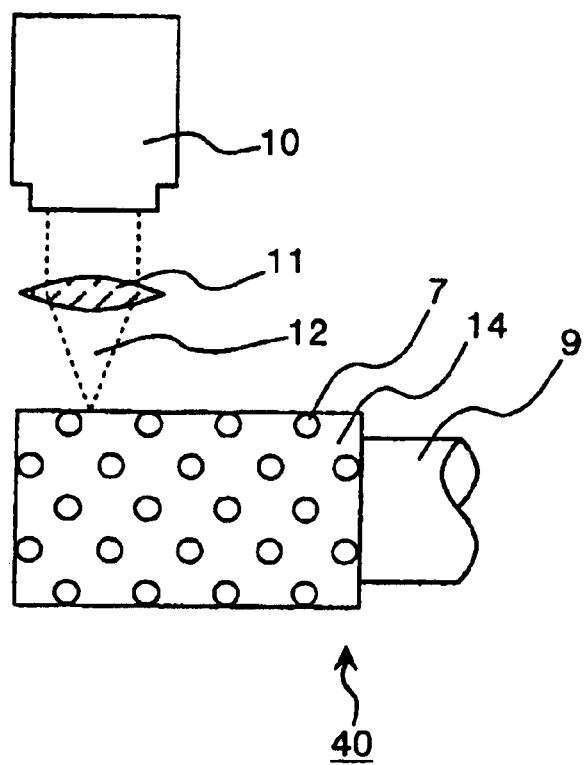
FIG. 11 is a side view which shows a conceptual configuration for explaining a cleaning method of the grinder according to the fourth embodiment of this invention.

A fourth embodiment of this invention will be explained by using FIG. 10 and FIG. 11. In the fourth embodiment, attachments such as chips adhered on or in contact with the grinder 40 such as a metal grinder or a resin grinder are cleaned, using the non-contact tool conditioning system shown in FIG. 1. FIG. 10 and FIG. 11 are respectively cross sectional and front elevational views which explain the cleaning processing according to the fourth embodiment.

In FIG. 10 and FIG. 11, 40 denotes the grinder, 7 denotes the abrasive grains, 14 denotes the binder, 9 denotes the grinder base metal, 10 denotes the laser oscillator, 11 denotes the optical system including the condenser lens, 12 denotes the laser beam irradiated from the laser oscillator and condensed by the optical system 11, and 15 denotes attachments such as chips. For example, CBN abrasive grains are used for the abrasive grains 7, metal such as iron is used for the binder 14 and a YAG laser in which the beam diameter is stopped down to 10 μm is used for the laser beam 12. The chips 15 are the workpiece itself, and for example, a stainless steel.

When the grinder 40 is to be cleaned, the motor 17 is rotated to rotate the grinder 40. The irradiation position and irradiation direction of the laser are also controlled, as in the third embodiment, so that the laser beam 12 is irradiated towards the axial center of the grinder 40, in other words, from the direction of a normal of the grinder 40. In this state, laser on/off control or switching control of the laser beam blocking member (shutter) is performed by the laser oscillator 10 based on the observation result of the observation unit 22. Thereby, the laser beam 12 is not irradiated onto the abrasive grains 7 and the binder 14 but irradiated only onto the chips 15 which are welded on or in contact with the binder 14 or the abrasive grains 7 on the outer periphery of the grinder, that is, the laser beam 12 is selectively irradiated towards the grinder 40. Thereby, only the chips 15 are dissolved, evaporated and removed. Then, by moving the optical system 11 axially with respect to the grinder 40, to thereby move the laser beam 12 axially with respect to the grinder 40, the laser irradiation position is shifted axially with respect to the grinder 40.

When the laser irradiation position is shifted to the end of the grinder 40, the similar cleaning is performed by shifting the laser irradiation position axially in the opposite direction of the grinder 40. These cleanings are performed based on the observation result of the observation unit 22, until a necessary cleaning state is obtained.

By such cleaning, the condition of the grinder can be controlled without damaging the abrasive grains, thereby enabling highly accurate and highly efficient machining. It becomes also possible to prevent a distortion of the grinder due to machining resistance, which causes a problem in the contact type cleaning.

The non-contact cleaning may be performed by a special purpose machine for cleaning the grinder, or by a cutting plate. When the cleaning is carried out on the cutting plate, more accurate rotation control and tool fitting are possible. Hence, a difference in fitting the grinder to the spindle and the influence of the rotation deflection of the spindle can be reduced.

Fifth Embodiment

Figure 12:
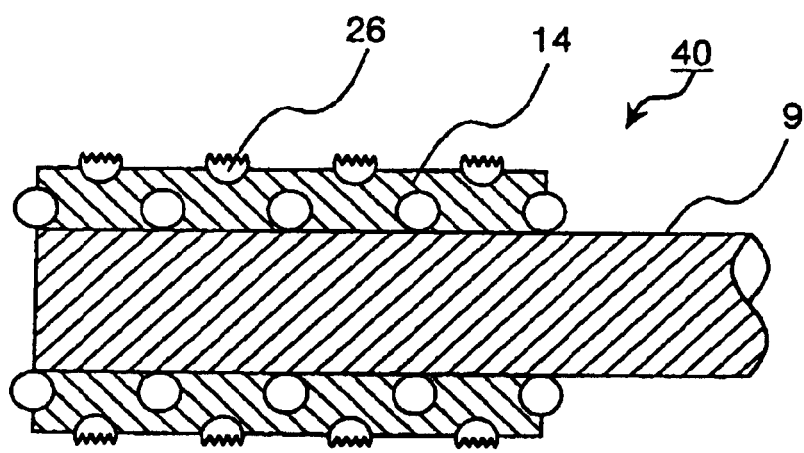
FIG. 12 is a cross sectional view which shows a conceptual configuration for explaining a truing method of a grinder according to a fifth embodiment of this invention.

A fifth embodiment of this invention will be explained by using FIG. 12. In the fifth embodiment, the laser beam is irradiated onto abrasive grains 26 of the grinder 40, such as a metal grinder or a resin grinder, using the non-contact tool conditioning system shown in FIG. 1, to thereby form abrasive grains 26 with microcracks in which a plurality of cutting edges are formed at the tip thereof, as shown in FIG. 12.

In order to form such abrasive grains 26 with microcracks, truing is executed for irradiating the laser beam onto the outermost peripheral portion (work plane) of the grinder 40 from the tangential direction of the grinder 40, as in the above-described first embodiment. Further, a plurality of cutting edges are formed at the tips of the abrasive grains 26, by performing laser on/off control or switching control of the laser beam blocking member (shutter), and by controlling the irradiation timing of the laser. In FIG. 12, 14 denotes a binder which holds the abrasive grains 26 with microcracks.

In this manner, not only by equalizing the tips of the abrasive grains 7 as in the first embodiment, but also by forming optional cutting edges on the abrasive grains 7, that is, by forming the abrasive grains 26 with microcracks, the sharpness of the grinder can be controlled. With the contact type truing and dressing, it is difficult to narrow down the truing and dressing conditions corresponding to the condition of a truer and the condition of the grinder. However, with the non-contact truing according to this fifth embodiment, a desired grinder can be obtained stably at all times since machining by means of contact is not involved.

Sixth Embodiment

A sixth embodiment of this invention will now be explained using FIG. 13. This sixth embodiment shows a modification example of the non-contact tool conditioning system, wherein a main shaft 24 comprising a chuck 25 which holds a workpiece is arranged so as to face the tool 16 fitted to the motor 17. The main shaft 24 is arranged independently from the table 18.

According to this non-contact tool conditioning system, after having performed truing, dressing or cleaning with respect to the tool 16, the workpiece fixed to the chuck 25 on the main shaft 24 can be machined without removing the tool 16.

The system in this sixth embodiment also becomes a machining apparatus having an apparatus for non-contact conditioning of tools. At this time, since truing, dressing or cleaning is carried out in the non-contact manner by using the above-described method, it becomes possible to overcome such a problem as a deflection of the edge of the tool due to a distortion of the tool because of the machining resistance caused by the conventional contact method, a difference in fitting the tool to the spindle, rotation deflection of the spindle, or due to variations in the edge positions of the tool. As a result, the variations in the edge positions or in the height of the abrasive grains become small, thereby enabling highly accurate machining. Further, since cutting edges or working abrasive grains working for machining increase, a machining load to each blade or each working abrasive grain is dispersed. Therefore, the machining load onto the tool can be further increased, thereby enabling highly efficient machining.

Seventh Embodiment

Figure 14:
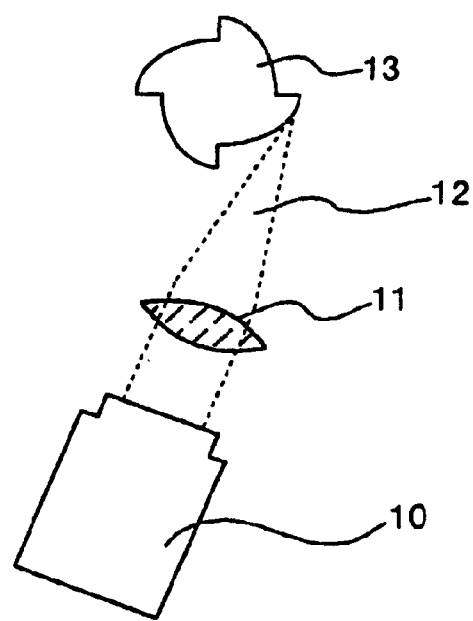
FIG. 14 is a diagram which shows a conceptual configuration for explaining a truing method of a cutting tool according to a seventh embodiment of this invention.

A seventh embodiment of this invention will now be explained by using FIG. 14. This seventh embodiment is a variation of the second embodiment.

In this seventh embodiment, the laser beam is not irradiated from the tangential direction of the end mill 13 as in the second embodiment, but the laser beam is irradiated from a diagonal direction with an angle with respect to the tangent of the end mill 13, within the plane perpendicular to the axis of the end mill 13. The other parts are the same as in the second embodiment, and repeated explanation is omitted.

Eighth Embodiment

Figure 15:
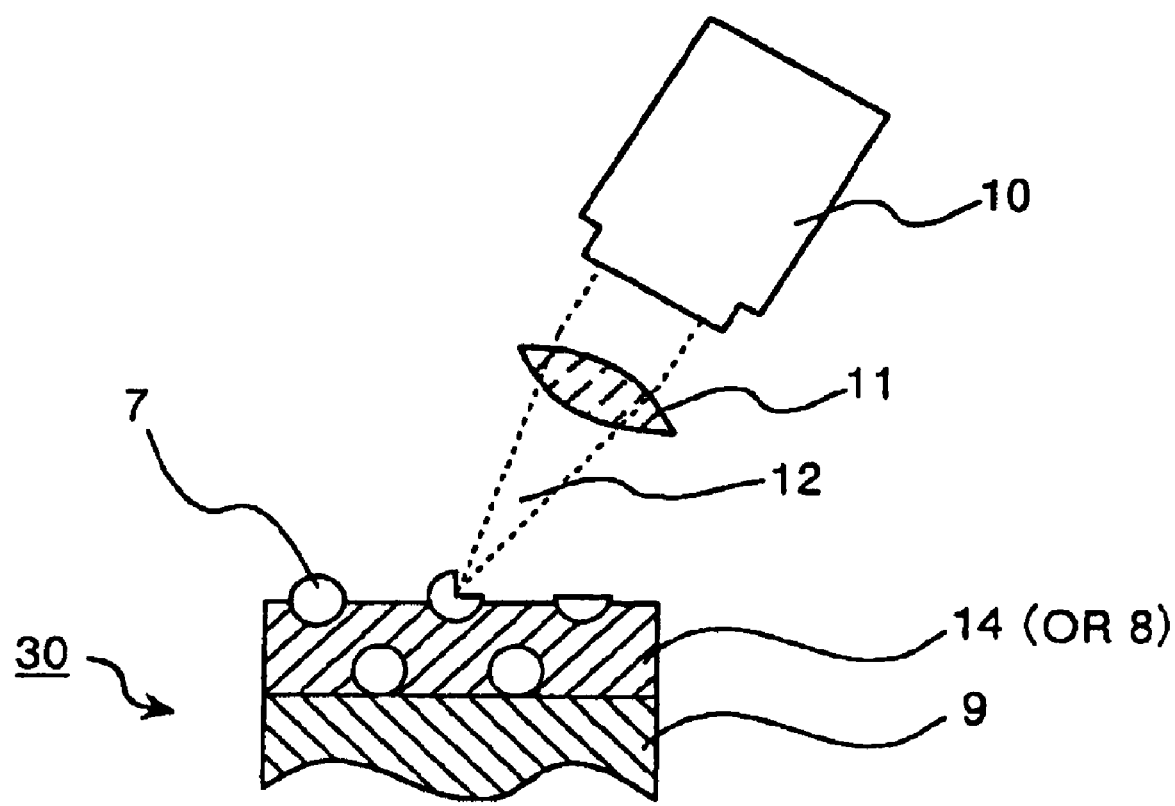
FIG. 15 is a diagram which shows a conceptual configuration for explaining a truing method of a cutting tool according to an eighth embodiment of this invention.

An eighth embodiment of this invention will now be explained by using FIG. 15. This eighth embodiment is a variation of the first embodiment. As the grinder 30, an electrodeposited grinder, a metal grinder, a vitrified grinder and a resinoid grinder may be employed. In this eighth embodiment, the laser beam is not irradiated from the tangential direction of the grinder 30 as in the first embodiment, but the laser beam is irradiated from a diagonal direction with an angle with respect to the tangent of the grinder 30, within the plane parallel to the axis of the grinder 30. The other parts are the same as in the second embodiment, and repeated explanation is omitted.

In the above embodiment, the kind of the abrasive grains is CBN abrasive grains, and the kind of the binder is electrodeposited, metal or resinoid binder, but the present invention can be applied to any optional kind of grinder using other abrasive grains and binder. In addition, as the cutting tool, the end mill has been mentioned, but the present invention is not limited thereto. To control irradiation of the laser beam, the tool side is moved herein, but the tool side may be fixed. The beam diameter of the laser beam is designated as 10 μm, but the beam diameter is not limited thereto, and other beam diameter may be used.

Ninth Embodiment

FIG. 16 is a diagram which shows the construction of a grinder 50 according to a ninth embodiment of this invention. Here, the grinder 50 is an electrodeposited grinder. In FIG. 16, the electrodeposited grinder 50 comprises a columnar base metal 51, a nickel or chromium plating layer 52 formed on the circumference of the base metal 51, and CBN or diamond abrasive grains 53 arranged in one layer or in a plurality of layers on the surface of the plating layer 52. The abrasive grains 53 are continuously fixed helically on the plating layer 52 by electrodeposition. Each of the abrasive grains 53 is arranged with the height being equalized by the irradiation of the laser beam.

When a workpiece such as the above-described scroll tooth is to be machined using such a grinder 50, a holding part 54 of the grinder 50 is fitted to the rotation unit of a motor or the like, and the grinder 50 is rotated by the rotation unit. At this time, the side of the rotating grinder is brought into contact with the workpiece to execute machining.

As the grinder 50, there may be used not only the electrodeposited grinder but also a metal bond grinder in which the abrasive grains are fixed by a metal material such as tin, a vitrified grinder in which the abrasive grains are fixed by a glass crystal material such as feldspar, or a resin bond grinder in which the abrasive grains are fixed by a resin material such as phenol.

The grinder 50 shown in FIG. 1 is trued by the apparatus for non-contact conditioning of tools shown in FIG. 1, and the height of the abrasive grains 53 is equalized.

When the grinder 50 is subjected to truing, the motor 17 is rotated to rotate the grinder 50. In this state, the irradiation position and the irradiation direction of the laser are controlled so that the laser beam 12 is irradiated onto the abrasive grains 53 on the outermost periphery of the grinder 50 from the tangential direction thereof, as shown in FIG. 2. Thereby, the outermost portions of the abrasive grains 53 where the laser beam has been irradiated are dissolved, evaporated and removed. Then, by moving the movable table 18 or moving the optical system 11 axially with respect to the grinder 50, to thereby move the laser beam 12 axially with respect to the grinder 50, the laser irradiation position is shifted axially with respect to the grinder 50. As a result, the truing locus of the laser beam becomes helical. By performing such truing, the height of the abrasive grains 53 is equalized to a certain height.

Figure 17A:
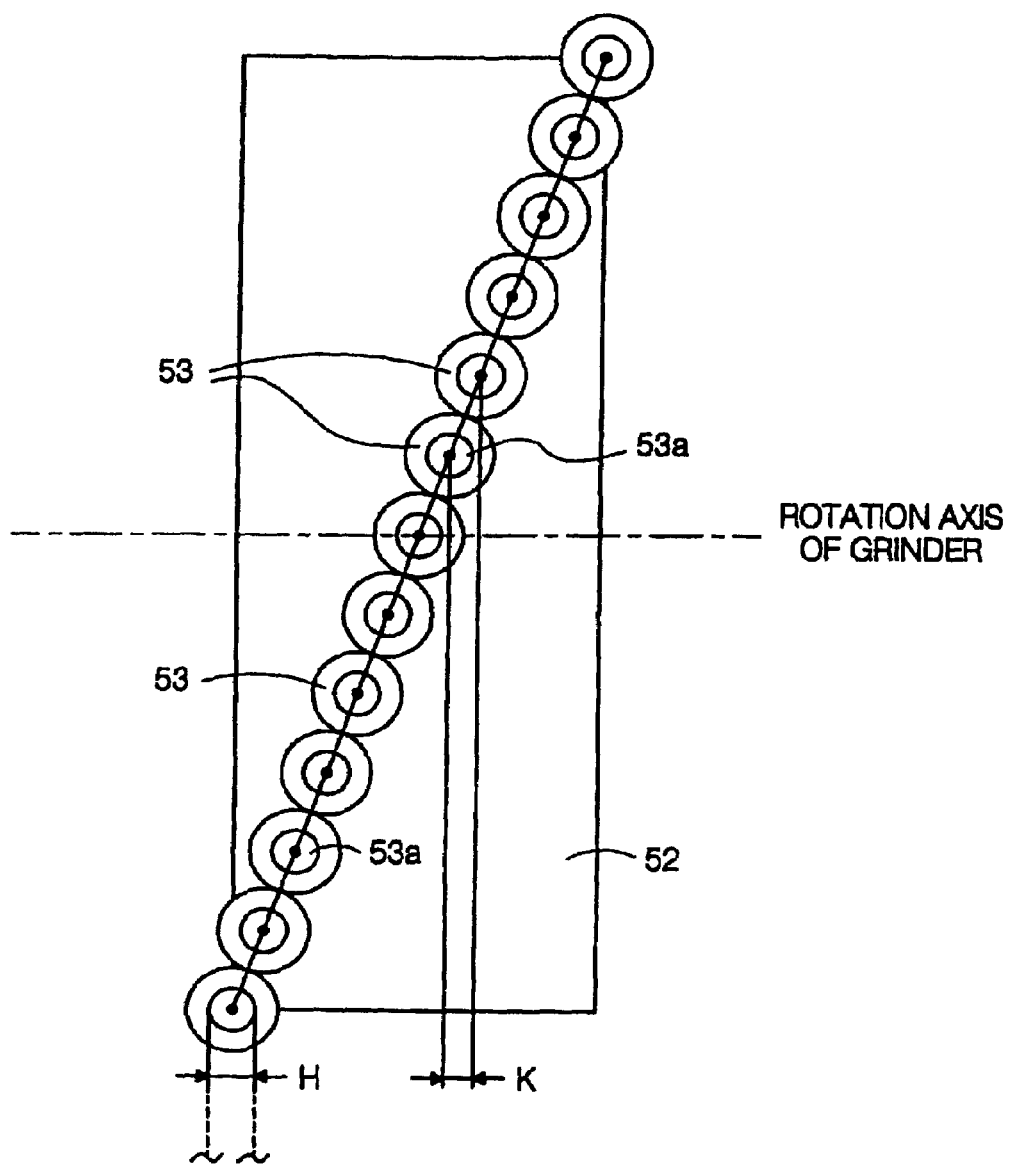
FIG. 17 is a developed plan view and a developed side view of the electrodeposited grinder according to the ninth embodiment of this invention.
Figure 17B:
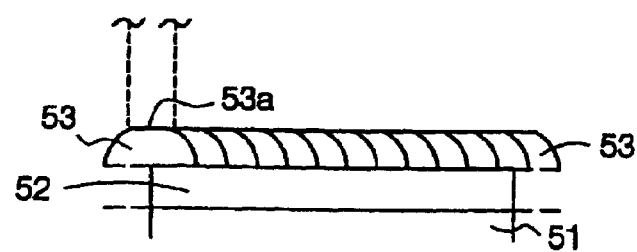

FIG. 17 is a diagram in which one pitch on the side face of the grinder is developed for explaining the function of the grinder according to the ninth embodiment. In this instance, each of the abrasive grains 53 is assumed to be spherical and having the same size. As shown in FIG. 17(b), it is also assumed that the protruded height of each abrasive grain 53 from the surface of the plating layer 52 is constant. As shown in FIG. 17(b), the tips of the whole abrasive grains 53 are made flat by means of the above described truing.

When it is assumed that the width (diameter) of the flat portion 53a is H and the center-to-center dimension of two adjacent abrasive grains 53 in the direction of the rotation axis is K, each abrasive grain 53 is arranged so that the relation of H=K is obtained, and each abrasive grain 53 is brought into diagonal contact with each other. By repeating this arrangement, the abrasive grains 53 are electrodeposited so as to be linear in the developed diagram, to thereby arrange the abrasive grains 53 helically.

When cutting is carried out with respect to the workpiece, by bringing the side face of the rotating grinder 50 into contact with the workpiece, the workpiece is machined by the flat portion 53a at the tip of the abrasive grain 53, being a cutting edge of the rotating grinder 50. At this time, after one abrasive grain 53 forming the flat portion 53a has removed the surface portion of the workpiece, the next adjacent abrasive grain 53 removes a portion on the surface portion of the workpiece, which is axially displaced by K, at a slightly delayed timing. Here, since H=K, the workpiece is continuously machined by the flat portion 53a of each abrasive grain without being interrupted.

As described above, according to the ninth embodiment, since the abrasive grains 53 are helically arranged, the abrasive grains 53 are arranged so as to continuously machine the surface of the workpiece to be machined, thereby improving the accuracy of the machined surface. Further, since the adjacent abrasive grains 53 are arranged so as to diagonally come in contact with the adjacent abrasive grains 53, the interval from when one abrasive grain comes in contact with the workpiece until the next abrasive grain comes in contact with the workpiece becomes short, thereby reducing the fluctuation in the machining load.

The adjacent abrasive grains may not be in contact with each other, and may be arranged so as to be slightly apart from each other. Further, each abrasive grain needs only be arranged roughly helically as a whole, and may be arranged in a staggered state as seen locally. That is, with respect to a certain abrasive grain, the adjacent abrasive grain may exist in a radially optional position which satisfies H≧K, or two or more abrasive grains may exist in a different direction.

Tenth Embodiment

Figure 18:
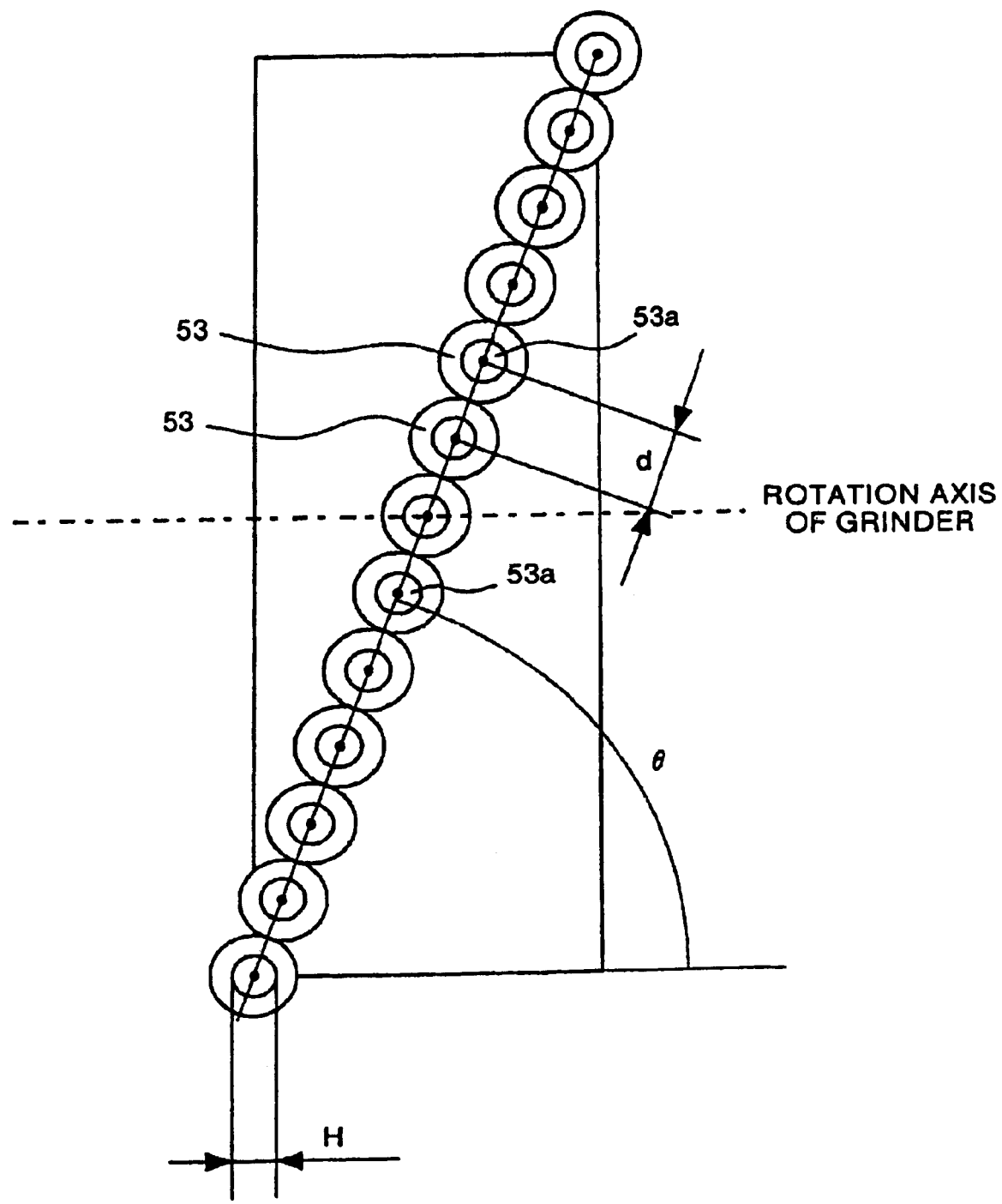
FIG. 18 is a developed plan view which shows an electrodeposited grinder according to a tenth embodiment of this invention.

A tenth embodiment will now be explained in accordance with FIG. 18. FIG. 18 is a developed diagram which shows the side face of the grinder 50, as in FIG. 17.

In FIG. 18, if it is assumed that the average width of a flat portion 53a at the tip of each abrasive grain 53 whose height is equalized by irradiating a laser beam is H, the average diameter of the abrasive grains is d, and the torsion angle of the helix is θ, the torsion angle θ is expressed as:

$$\cos^{-1}(H/d) \leq \theta < 90°$$

As described above, by designating the torsion angle θ of the helix formed by each abrasive grain as $\cos^{-1}(H/d) \leq \theta < 90°$, the flat portion 53a of each of the adjacent abrasive grains 53 reliably overlaps on the machined surface of the workpiece and the surface is machined, thereby further improving the accuracy of the machined surface. For example, if it is assumed that the diameter of a spherical abrasive grain corresponding to the grain size of 80 is about 180 μm and one fourth of the diameter of the abrasive grain is removed by truing so that the flat portion 53a becomes 90 μm, $\cos^{-1}(H/d)=60°$. The diameter of the base metal of the grinder depends on the number of the abrasive grains, but for example, if it is assumed that the number of the abrasive grains which continuously come in contact with each other with θ=60° is 60, and the 60 abrasive grains correspond to one round of the diameter of the grinder base metal, the diameter of the grinder base metal becomes about 3 mm.

Eleventh Embodiment

An eleventh embodiment of this invention will be explained using FIG. 19. FIG. 19 is a diagram which shows a grinder 70 according to the eleventh embodiment.

This electrodeposited grinder 70 comprises a columnar base metal 71, a nickel or chromium plating layer 72 formed on the circumference of the base metal 71, and CBN or diamond abrasive grains 73 arranged only in one layer on the surface of the plating layer 72, and a helical groove 74 formed by laser irradiation.

Each of the abrasive grains 73 is not helically arranged as in the ninth and tenth embodiments, but closely arranged and fixed at random by electrodeposition. Each of the abrasive grains 73 is trued by irradiating the laser beam onto the grains to equalize the height thereof, and the tip of each of the abrasive grains 73 becomes flat. Further, the helical groove 74 is formed by laser irradiation on the plating layer 72 and the abrasive grains 73.

Each of the abrasive grains 73 arranged at random is irradiated by the laser beam from the tangential direction of each abrasive grain, using the apparatus for non-contact conditioning of tools shown in FIG. 1, thereby executing truing for equalizing the height of each abrasive grain.

The helical groove 74 is also formed by laser irradiation, using the apparatus for non-contact conditioning of tools shown in FIG. 1. That is, the optical system 11 including the condenser lens or the movable table 18 is shifted axially with respect to the grinder 70, while irradiating the laser beam in the tangential direction or in the normal direction of the grinder 70, to form the groove helically. Here, if the pitch between the grooves 74 is too narrow, almost all of the abrasive grains 73 are removed. Therefore, the shift of the optical system 11 including the condenser lens or the movable table 18 is controlled so that the pitch between the grooves 74 becomes larger than the diameter of the abrasive grain 73.

In the grinder 70 according to this eleventh embodiment, since truing is carried out with respect to each abrasive grain, the workpiece is machined by the flat portion at the tip being a cutting edge of the rotating grinder, as in the ninth embodiment, thereby improving the accuracy of the machined surface. When the groove 74 is not formed helically, however, the number of abrasive grains working on the machined surface of the workpiece increases, thereby increasing the machining load.

Therefore, in this eleventh embodiment, by forming the groove 74 helically, the number of abrasive grains working on the machined surface of the workpiece is decreased, so as to decrease the machining load. By forming the groove 74, the chips discharging property is also improved. That is, forming the groove 74 helically, as in this eleventh embodiment, makes the apparent shape of the grinder surface substantially the same as that of the grinder obtained by arranging the grinder helically as in the ninth embodiment, and hence the similar effect to that of the ninth embodiment can be obtained.

Twelfth Embodiment

Figure 20B:
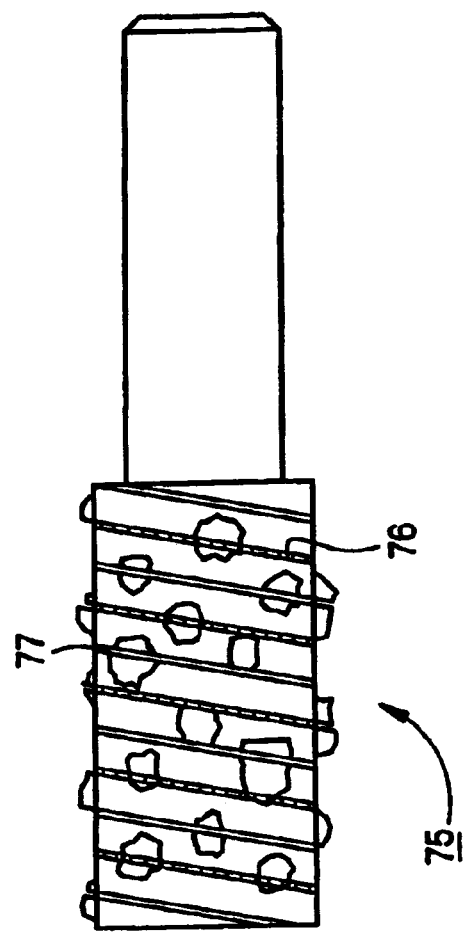
FIG. 20 is a front elevational and a cross sectional view which show an electrodeposited grinder according to a twelfth embodiment of this invention.
Figure 20A:
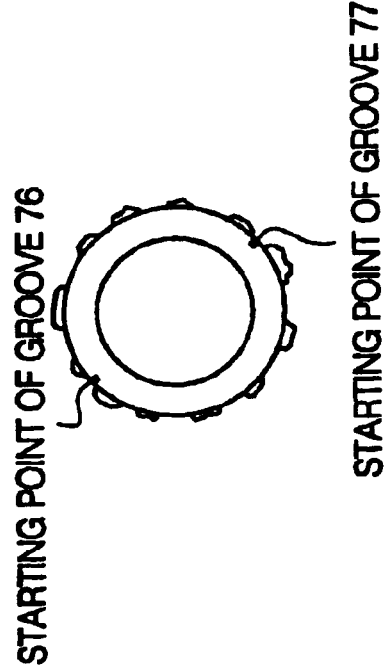

A twelfth embodiment of this invention will be explained using FIG. 20. FIG. 20 is a diagram which shows a grinder 75 according to the twelfth embodiment.

In the grinder 75 of this twelfth embodiment, two helical grooves 76 and 77 are formed parallel with each other. That is, as described above, the laser beam is irradiated from the tangential direction or the normal direction of the grinder 75 to form the first groove 76 helically, and then, the phase of the starting point of the helix is shifted by 180°, and the laser beam is again irradiated to form the second groove 77. The number of the starting point of the helix may be increased to 3 or more. In the grinder according to the twelfth embodiment, since the groove is formed helically in a plurality of numbers, the number of abrasive grains working on the machined surface of the workpiece further decreases, thereby decreasing the machining load. Furthermore, by forming the plurality of helical grooves, the chips discharging property further improves.

Thirteenth Embodiment

Figure 21B:
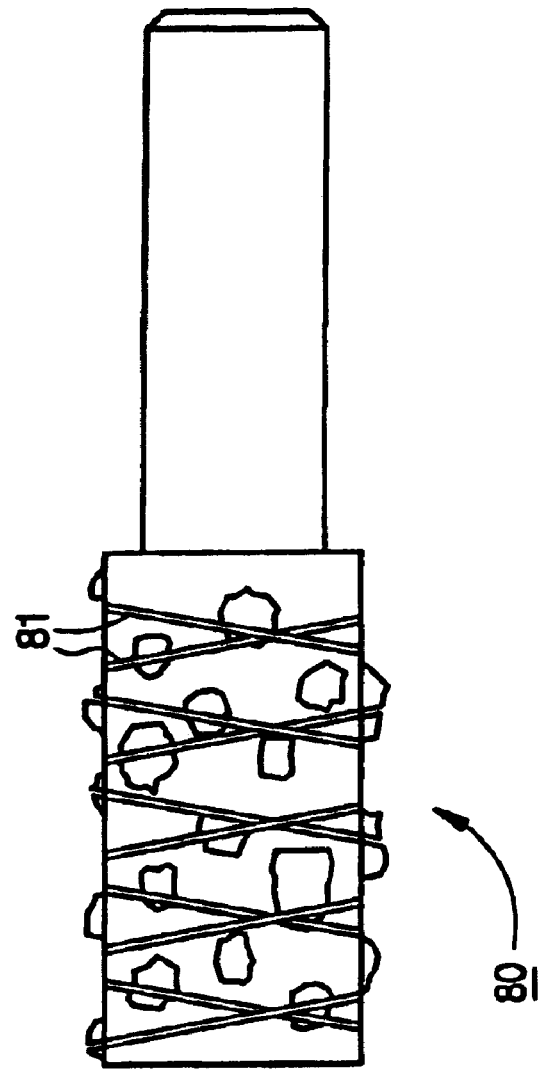
FIG. 21 is a front elevational and a cross sectional view which show an electrodeposited grinder according to a thirteenth embodiment of this invention.
Figure 21A:
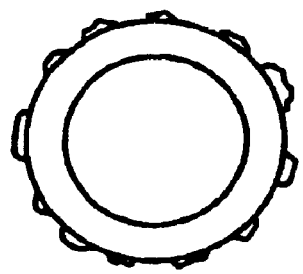

A thirteenth embodiment of this invention will be explained using FIG. 21. FIG. 21 is a diagram which shows a grinder 80 according to the thirteenth embodiment. In the grinder 80 of this thirteenth embodiment, diagonally-crossed grooves 81 are formed by irradiating the laser beam from the tangential direction or the normal direction.

In the grinder 80 of this thirteenth embodiment, since the grooves are formed so as to diagonally cross each other, the number of the abrasive grains working on the machined surface of the workpiece further decreases, thereby decreasing the machining load. Furthermore, by forming a plurality of helical grooves, the chips discharging property further improves.

Fourteenth Embodiment

Figure 22A:
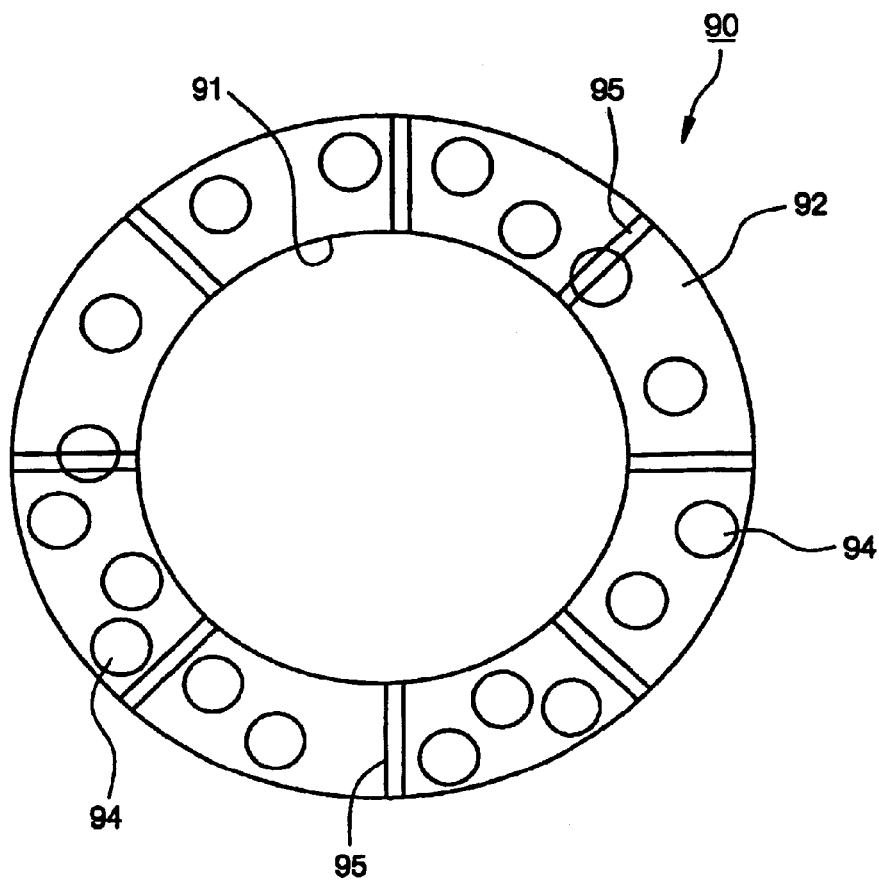
FIG. 22 is a diagram which shows an electrodeposited grinder according to a fourteenth embodiment of this invention, (a) being a plan view and (b) being a side view.
Figure 22B:
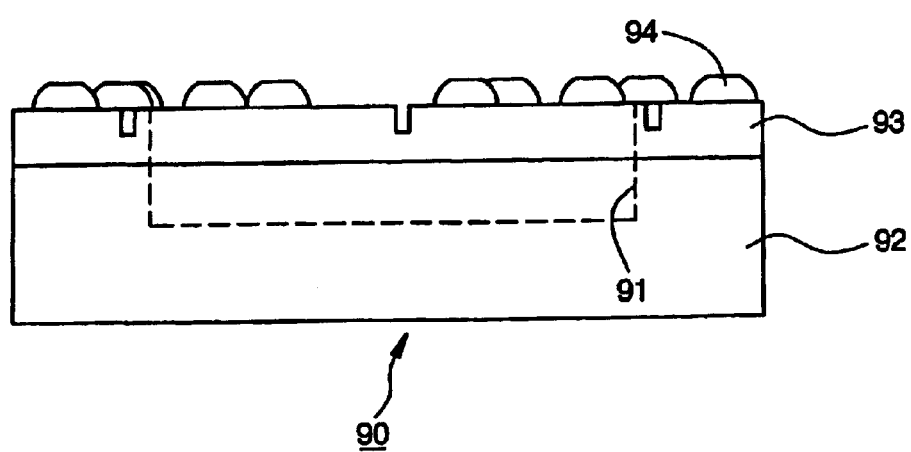

A fourteenth embodiment of this invention will now be explained using FIG. 22 to FIG. 24. FIG. 22 is a diagram which shows an electrodeposited grinder 90 according to the fourteenth embodiment. FIG. 22(a) is a plan view which shows a cutting plane of the electrodeposited grinder 90, and FIG. 22(b) is a side view thereof.

In this fourteenth embodiment, the present invention is applied to a disc-shaped grinder in which the abrasive grains are arranged not on the circumference thereof, but on the plane thereof.

In this electrodeposited grinder 90, a recessed portion 91 is formed in the center thereof, and a cutting plane is formed in the ring portion on the circumference thereof. That is, a nickel or chromium plating layer 93 is formed on the ring-shaped plane of a disc-shaped base metal 92, with the recessed portion 91 formed in the center thereof. Abrasive grains 94 of CBN or diamond are put together at random and fixed by electrodeposition, in one layer or in a plurality of layers on the surface of this plating layer 93. Each of the abrasive grains 94 is trued by the irradiation of the laser beam, to equalize the height thereof, and the tip of each abrasive grain 73 becomes flat. Further, a radial groove 95 is formed on the ring-shaped cutting plane by the laser irradiation.

In this electrodeposited grinder 90, while rotating the grinder 90 centering on the axis of the disc, the grinder 90 and the workpiece are relatively moved, to bring the abrasive grains of the electrodeposited grinder into contact with the planar workpiece, thereby executing cutting.

Figure 23:
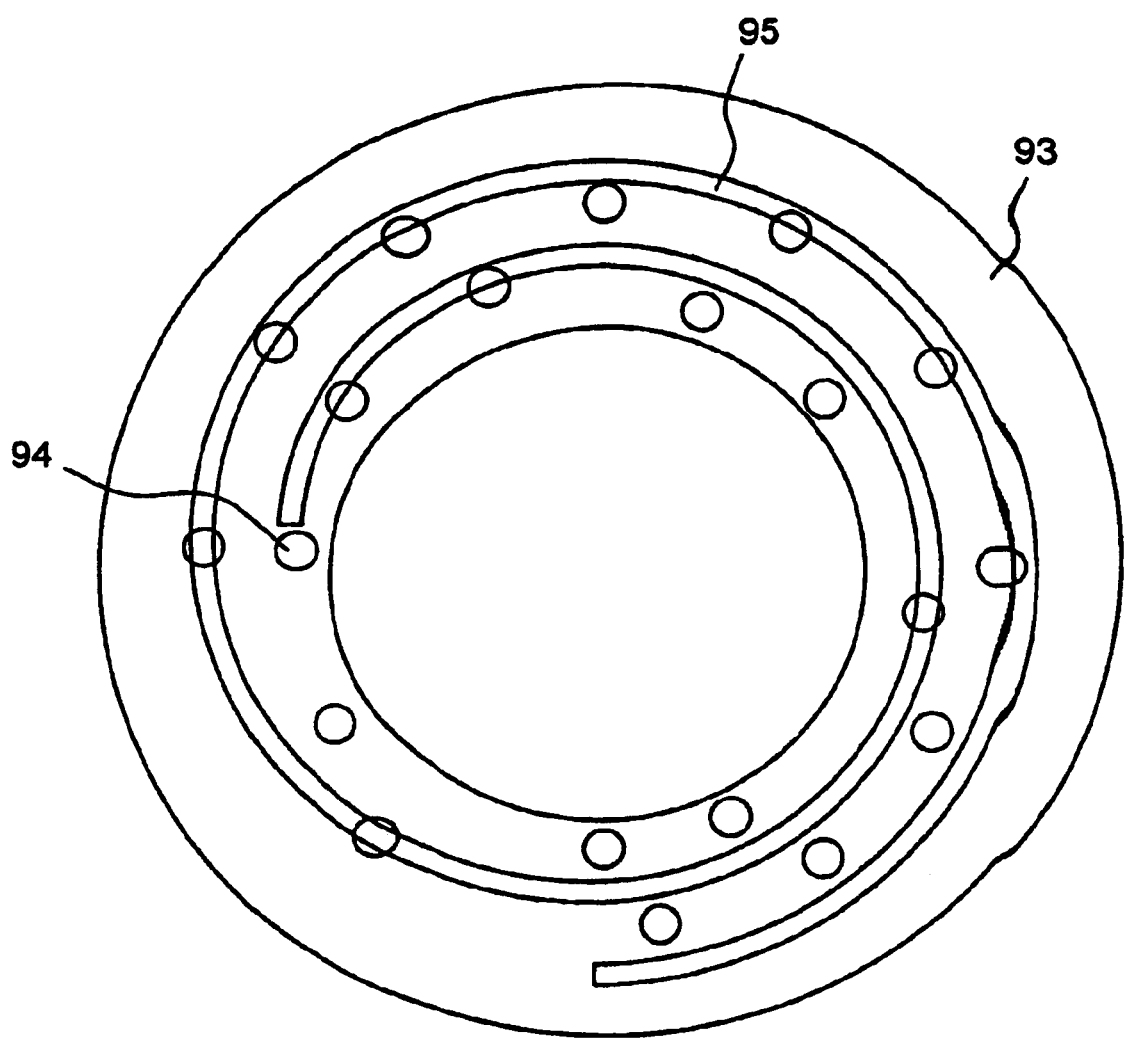
FIG. 23 is a plan view which shows the electrodeposited grinder according to the fourteenth embodiment of this invention.

The groove 95 formed by the laser irradiation may be helical as shown in FIG. 23, or an optional shape such as a concentric circular shape. As the grinder 90, there may be used not only the electrodeposited grinder but also a metal bond grinder in which the abrasive grains are fixed by a metal material such as tin, a vitrified grinder in which the abrasive grains are fixed by a glass crystal material such as feldspar, or a resin bond grinder in which the abrasive grains are fixed by a resin material such as phenol. Further, as the disc-shaped grinder, it is not limited to the ring-shaped cutting plane as shown in FIG. 22 and FIG. 23, and the present invention may be applied to a grinder which uses the whole disc plane as the cutting plane as shown in FIG. 24.

In the grinder according to the fourteenth embodiment, since the height of the abrasive grains is equalized by the laser irradiation, the accuracy of the machined surface of the workpiece is improved. By forming the groove 95, the number of the abrasive grains working on the machined surface of the workpiece is reduced, thereby decreasing the machining load. In addition, by forming the groove 95, the chips discharging property is improved.

Figure 24:
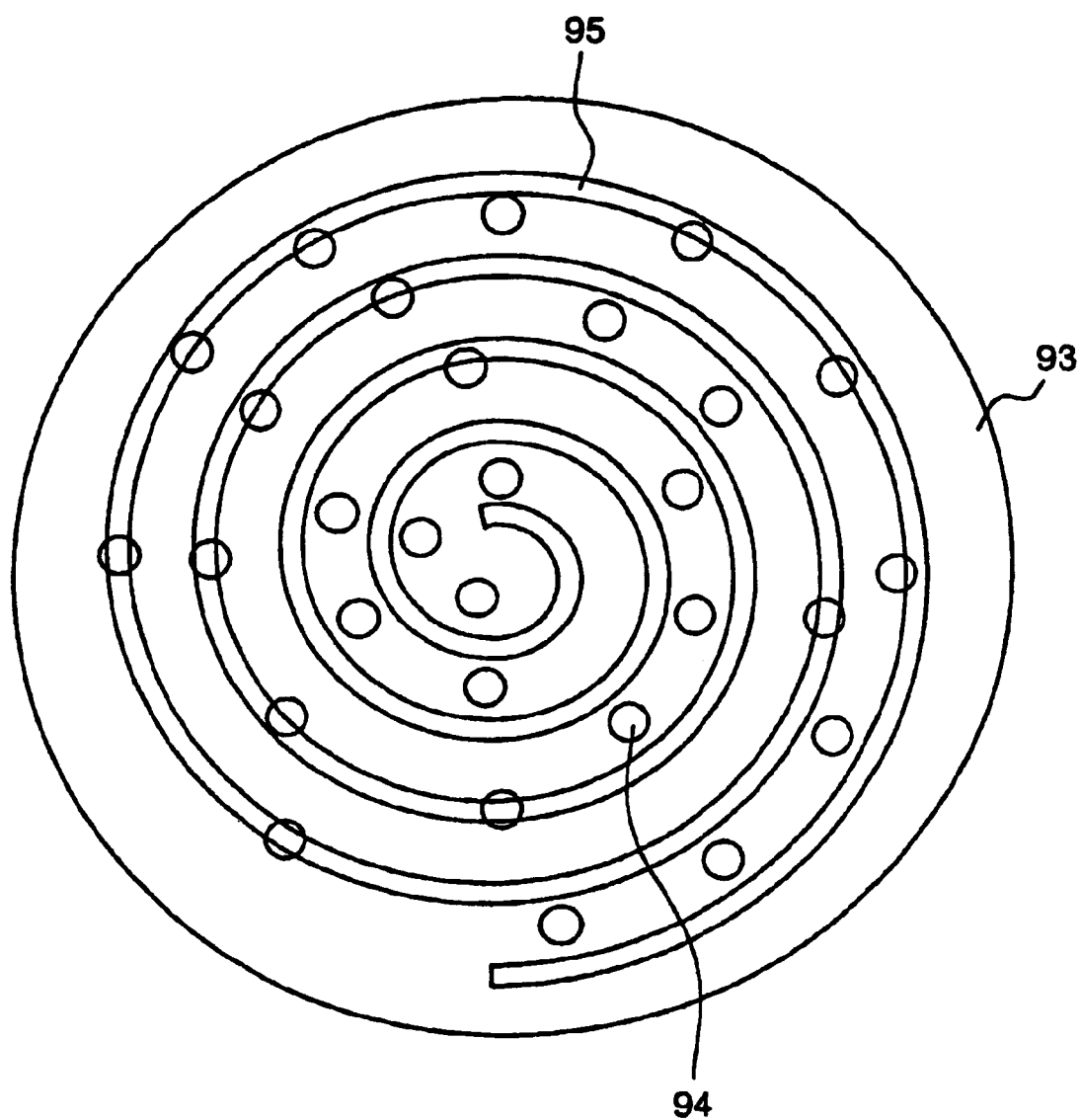
FIG. 24 is a plan view which shows the electrodeposited grinder according to the fourteenth embodiment of this invention.
Figure 25B:
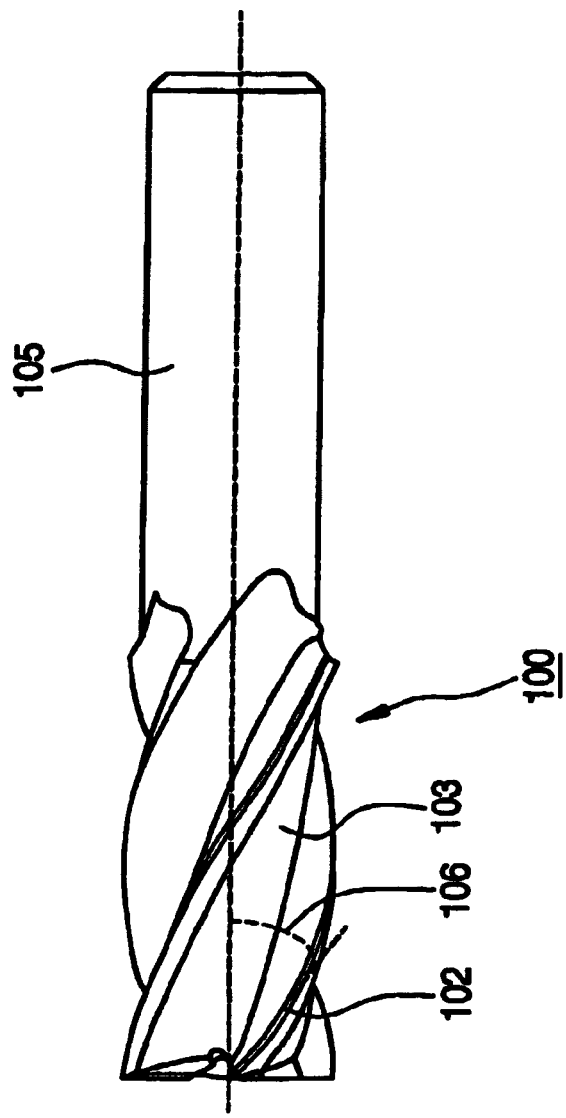
FIG. 25 is a diagram which shows an end mill.
Figure 25A:
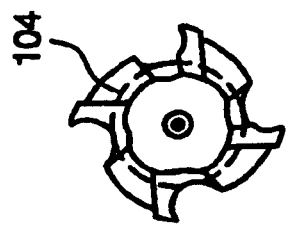
Figure 26:
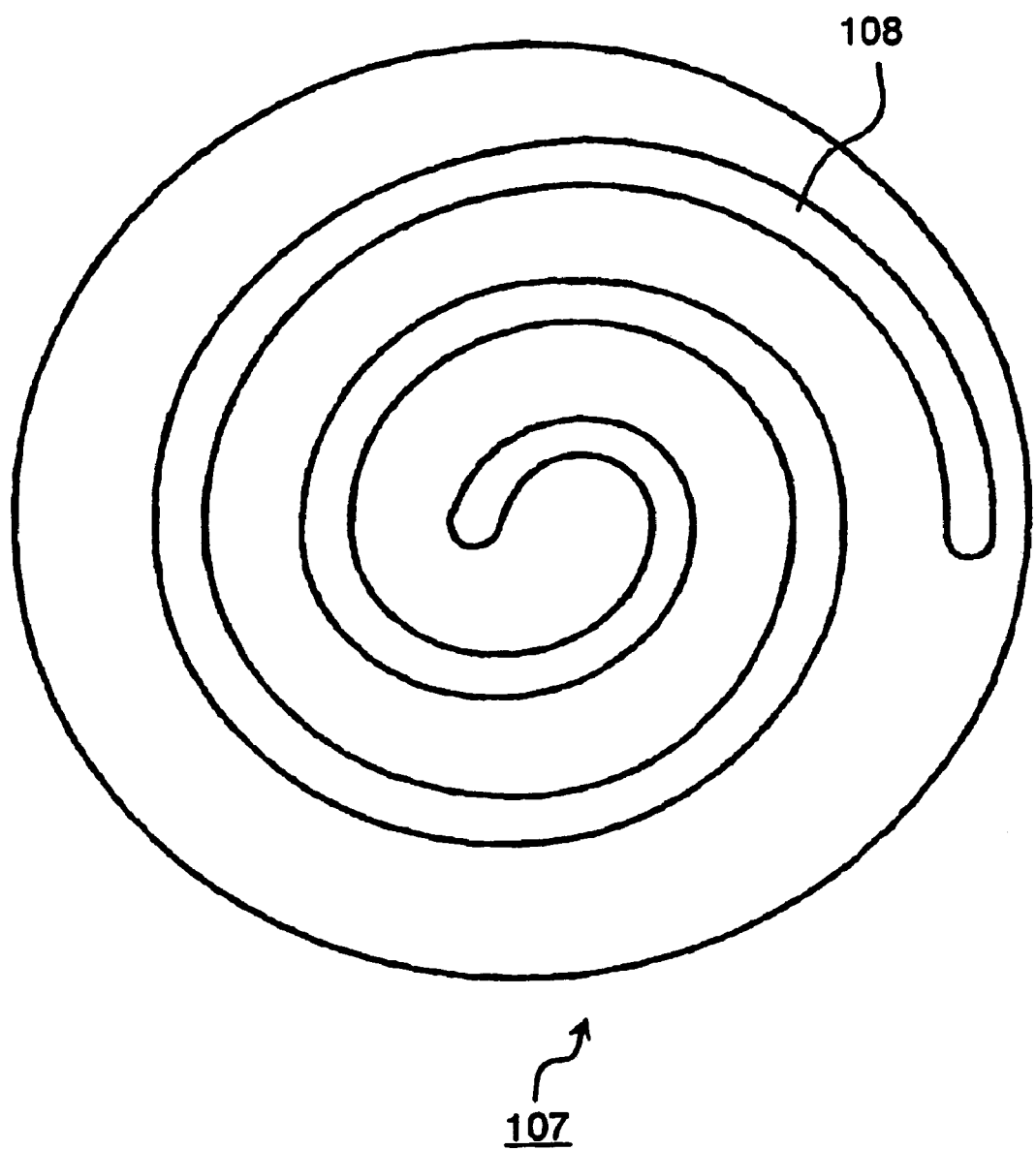
FIG. 26 is a plan view which shows one example of a workpiece to be machined.
Figure 27B:
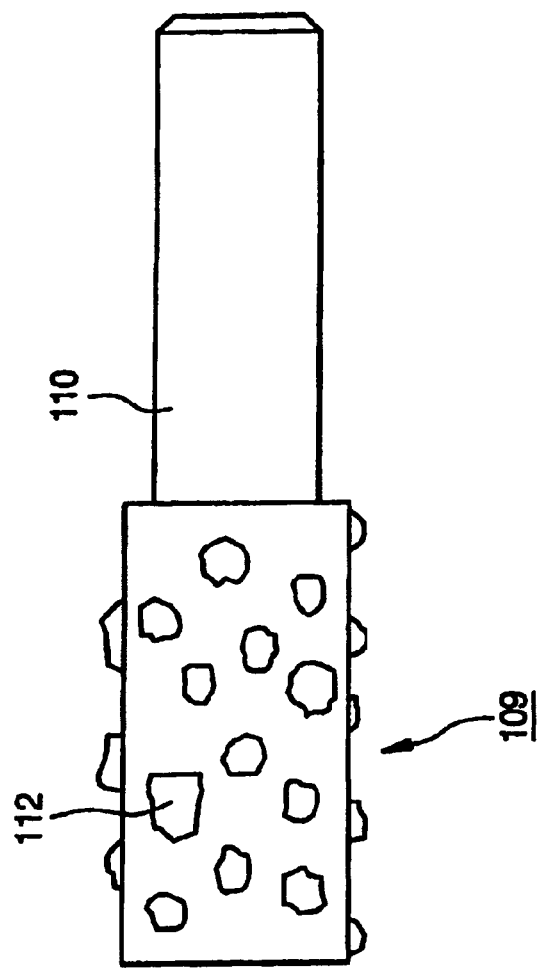
FIG. 27 is a front elevational and a cross sectional view which shows a conventional electrodeposited grinder.
Figure 27A:
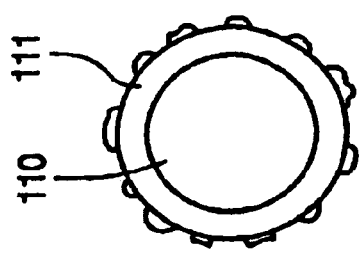
Figure 28C:
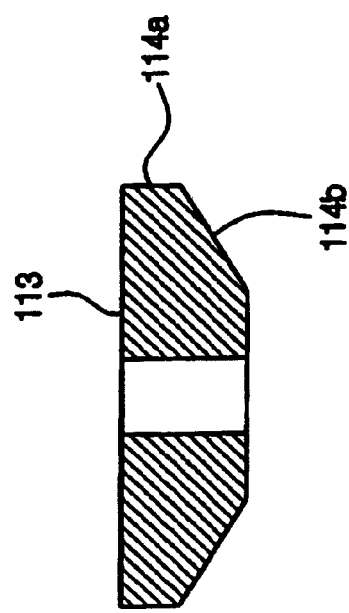
FIG. 28 is a diagram which shows a conventional dressing and truing technique.
Figure 28B:
Figure 28A:
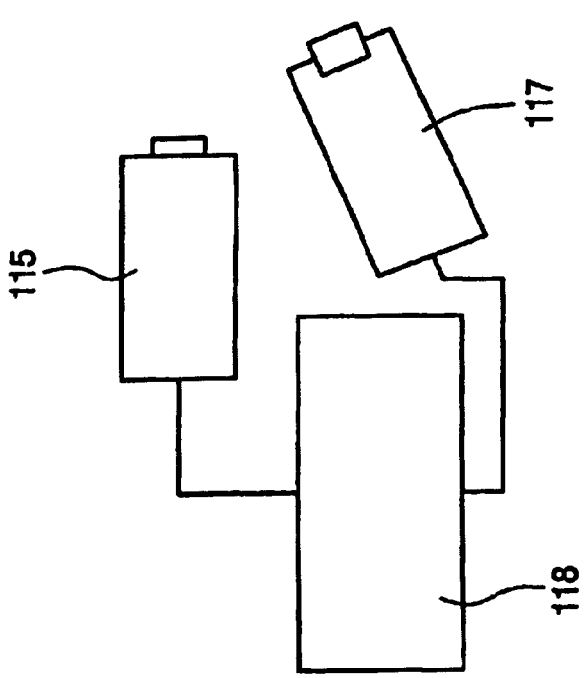

In the disc grinder as shown in FIG. 22 to FIG. 24, the abrasive grains may be arranged helically (in a curled form) on the planar cutting plane as shown in the ninth embodiment.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A grinder in which abrasive grains are fixed on the plane of a disc-shaped base metal or on the circumference of a columnar base metal, wherein the abrasive grains are helically arranged on the plane or circumference of the base metal on which the abrasive grains are fixed, wherein, the average width of a flat portion at the tips of the abrasive grains is designated as H, and the average of the diameter of the abrasive grains is designated as d, the torsion angle $\theta$ of the helix where the abrasive grains are arranged is within the range of:

$$\cos^{-1}(H/d) \leq \theta < 90°.$$

2. The grinder according to claim 1, wherein a laser beam is irradiated onto the abrasive grains to equalize the height of the abrasive grains.

3. A grinder, in which abrasive grains are fixed at random on the plane of a disc-shaped base metal or on the circumference of a columnar base metal, the grinder subjected to truing by the irradiation of a laser beam to equalize the height of the abrasive grains, the plane or circumference on which the abrasive grains are arranged having a groove formed by the irradiation of the laser beam.

4. The grinder according to claim 3, wherein the groove is formed helically.

5. The grinder according to claim 4, wherein the space between the helical grooves is made larger than the diameter of the abrasive grains.

6. The grinder according to claim 4, wherein the helical groove is formed in a plurality of numbers.

7. The grinder according to claim 6, wherein the space between the helical grooves is made larger than the diameter of the abrasive grains.

8. The grinder according to claim 6, wherein the plurality of helical grooves are formed so as to diagonally cross each other.

* * * * *

UNITED STATES PATENT AND TRADEMARK OFFICE
CERTIFICATE OF CORRECTION

PATENT NO. : 7,175,509 B2 Page 1 of 1
APPLICATION NO. : 10/755343
DATED : February 13, 2007
INVENTOR(S) : Munehisa Gunjima, Tomoaki Nakasuji and Kouji Yokota It is certified that error appears in the above-identified patent and that said Letters Patent is hereby corrected as shown below:

Title Page, Item (73) should read
ASSIGNEE:

-- ~~Itsubishi~~ Mitsubishi Denki Kabushiki Kaisha, Tokyo (JP) --.

Signed and Sealed this

First Day of December, 2009

David J. Kappos
*Director of the United States Patent and Trademark Office*